United States Patent [19]

Stoddard

[11] Patent Number: 4,870,631
[45] Date of Patent: Sep. 26, 1989

[54] OPTICAL TURNTABLE SYSTEM WITH REFLECTED SPOT POSITION DETECTION

[75] Inventor: Robert E. Stoddard, Sunnyvale, Calif.

[73] Assignee: Finial Technology, Inc., Sunnyvale, Calif.

[21] Appl. No.: 868,611

[22] Filed: May 30, 1986

[51] Int. Cl.$^4$ ............................................. G11B 11/18
[52] U.S. Cl. ..................................... 369/18; 369/17; 369/44; 369/45; 369/112
[58] Field of Search ................... 369/18, 275, 17, 110, 369/111, 100, 44–47, 112

[56] References Cited

U.S. PATENT DOCUMENTS

| Re. 30,723 | 8/1981 | Heine | 369/18 |
|---|---|---|---|
| 1,916,973 | 7/1933 | Friebus | 369/112 |
| 3,452,163 | 6/1969 | Dahlen | 369/110 |
| 3,530,258 | 9/1970 | Gregg et al. | 369/46 |
| 3,860,766 | 1/1975 | Mori | 369/17 |
| 4,216,357 | 8/1980 | Iwasaki et al. | 369/110 |
| 4,310,916 | 1/1982 | Dil | 369/47 |
| 4,378,491 | 3/1983 | Lehman | 369/18 |
| 4,534,021 | 8/1985 | Smith | 369/111 |
| 4,569,038 | 2/1986 | Nagashima et al. | 369/111 |

FOREIGN PATENT DOCUMENTS

| 52-57801 | 5/1977 | Japan | 369/18 |
|---|---|---|---|
| 54-102106 | 8/1979 | Japan | 369/18 |

Primary Examiner—Alan Faber
Assistant Examiner—H. Nguyen
Attorney, Agent, or Firm—Fliesler, Dubb, Meyer & Lovejoy

[57] ABSTRACT

Disclosed is an optical turntable system for optically playing phonograph records having a recorded signal in a groove formed by a wall having a position modulated by the recorded signal. An optical unit includes an optical source providing a first light beam incident onto the wall to provide a reflected beam from the wall forming a reflected spot at a reflected position proportional to the recorded signal and also includes an optical sensor for sensing the reflected postion of the reflected spot to provide an output data signal proportional to the recorded signal. The optical unit also includes a tracking assembly which functions to position the optical unit over the section of the groove of interest as the record turns.

54 Claims, 12 Drawing Sheets

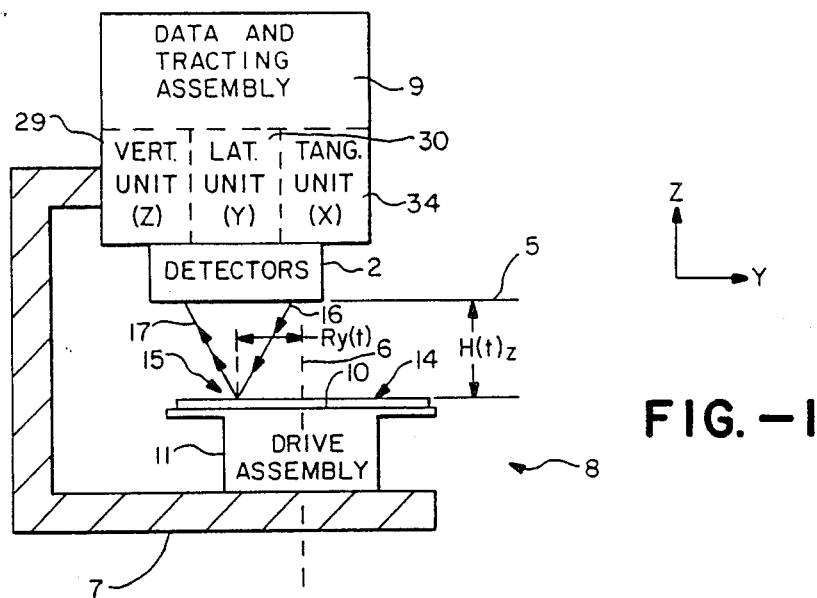
FIG.—1
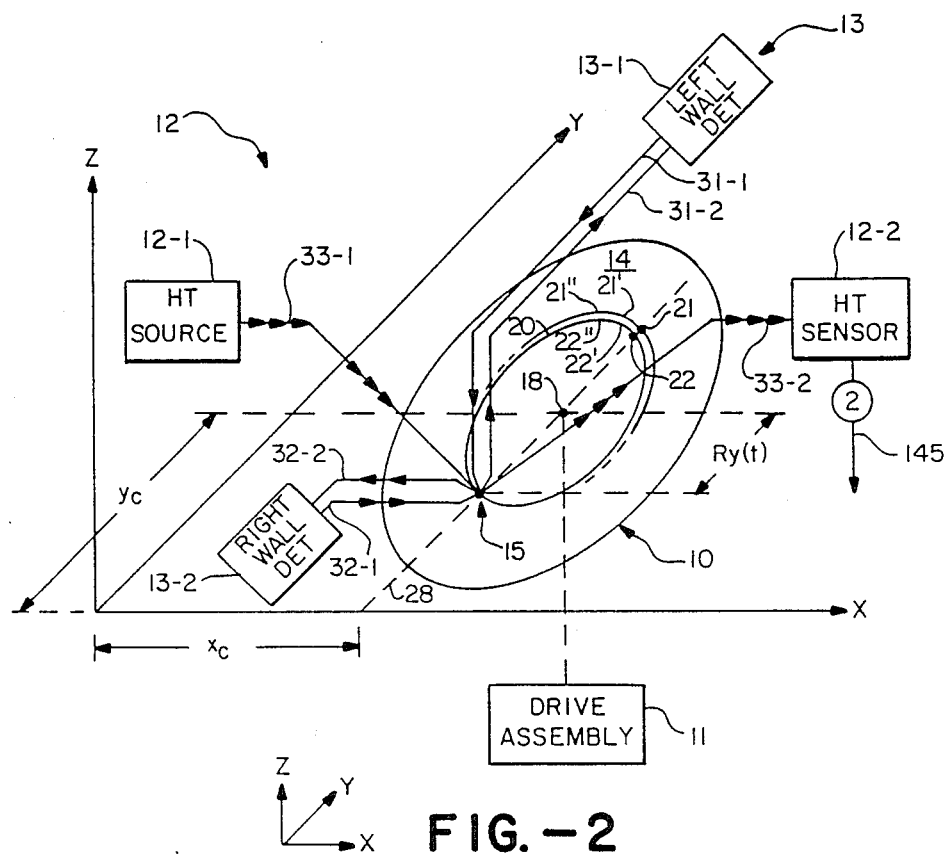
FIG.—2

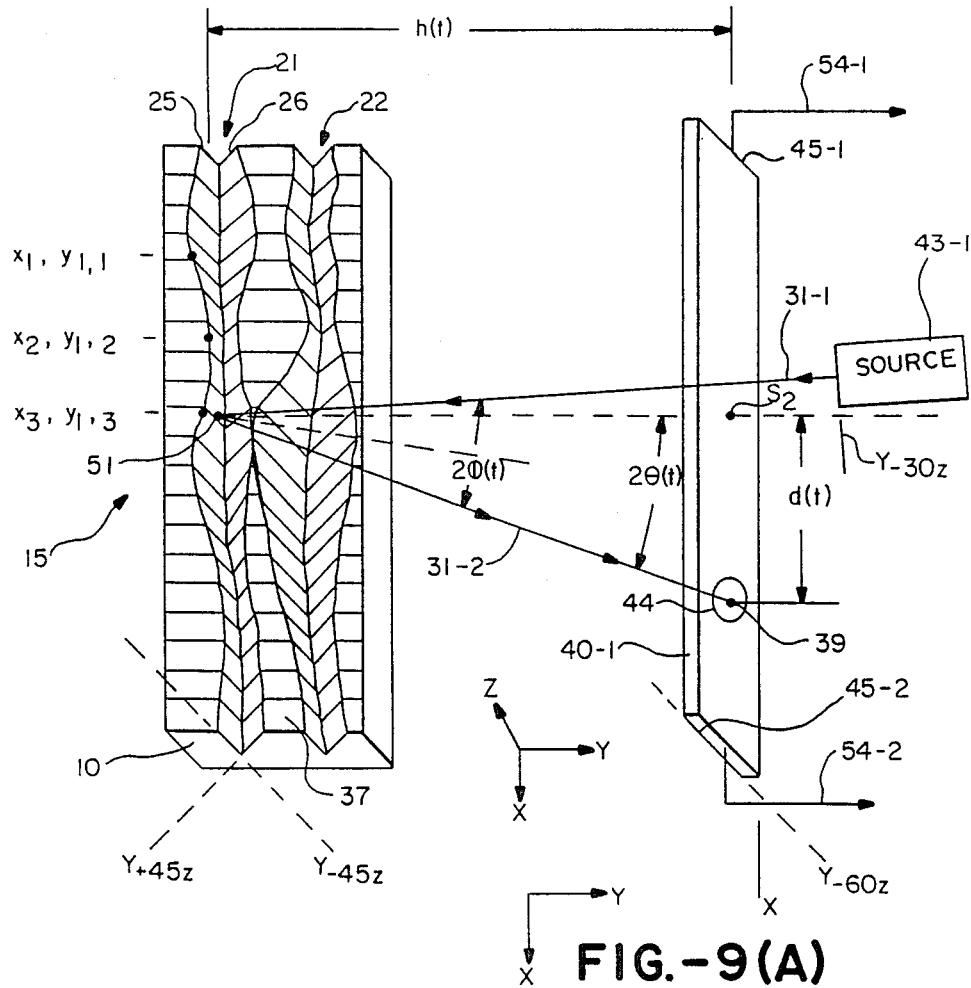
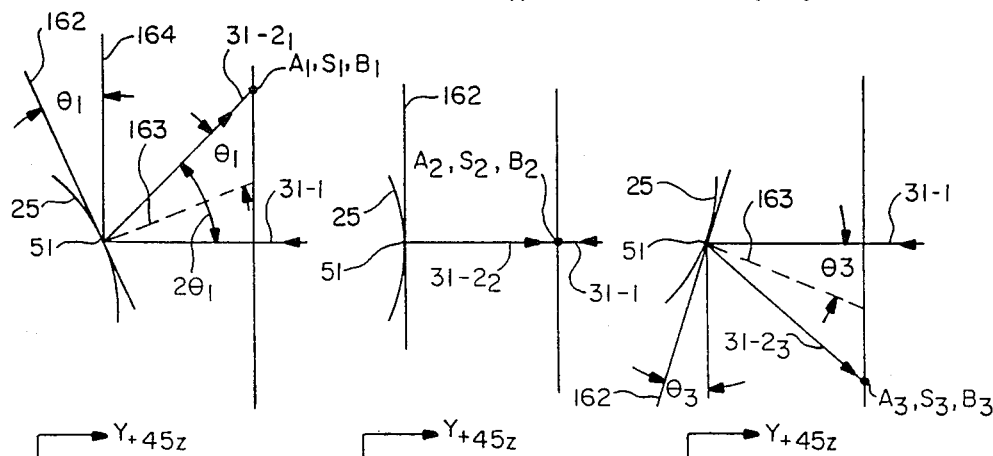
FIG.-9(A)
FIG.-9(B)   FIG.-9(C)   FIG.-9(D)

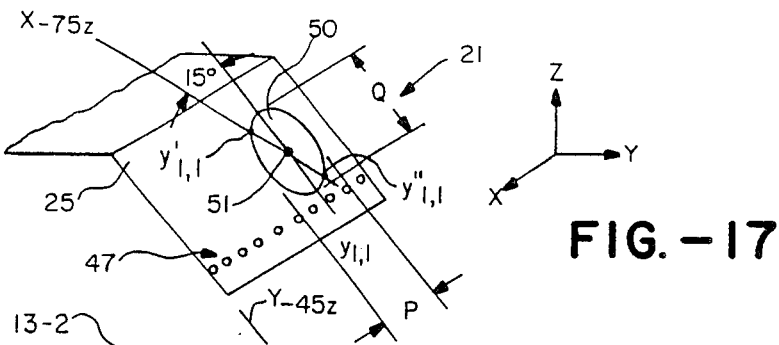
FIG.—17
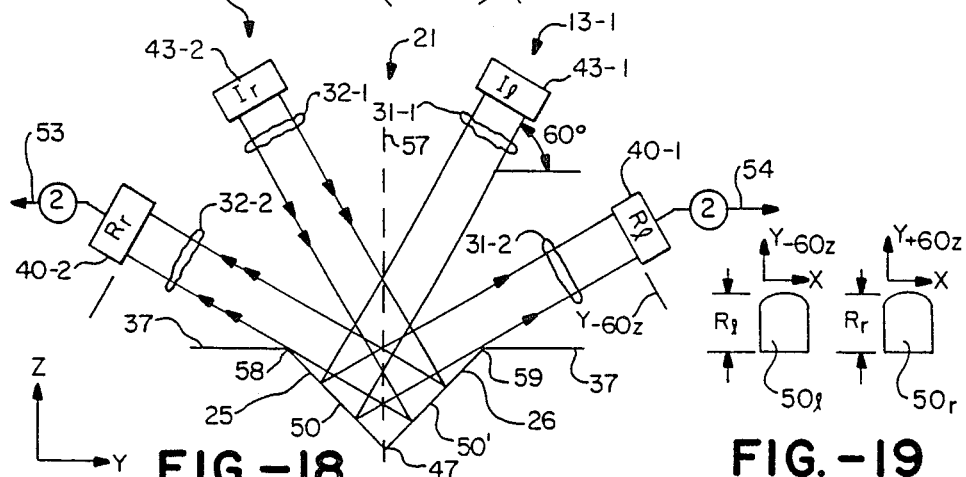
FIG.—18
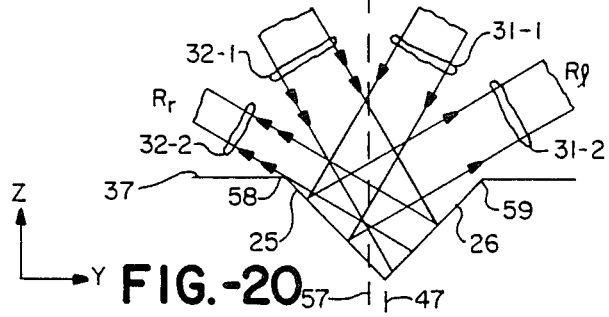
FIG.—20
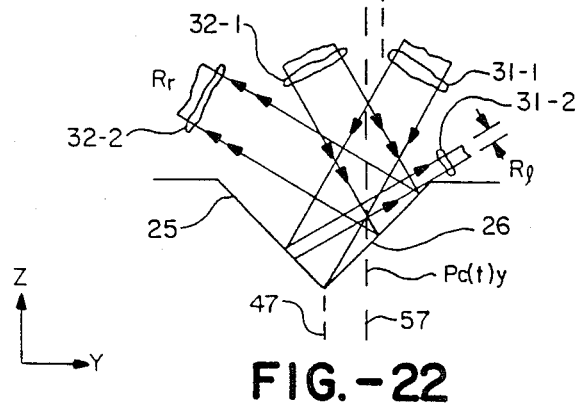
FIG.—22
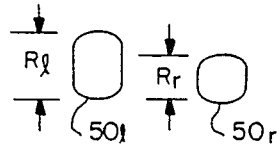
FIG.—19
FIG.—21
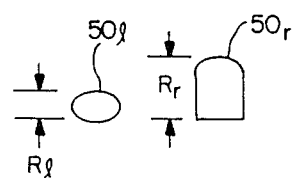
FIG.—23

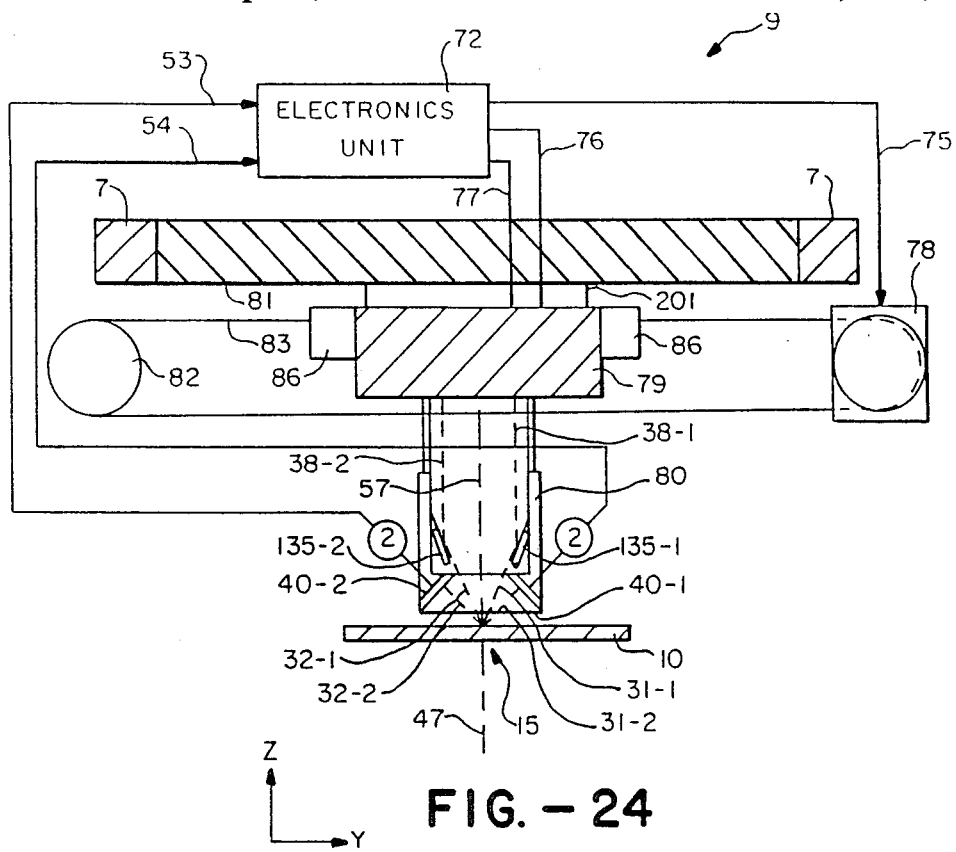
FIG.—24
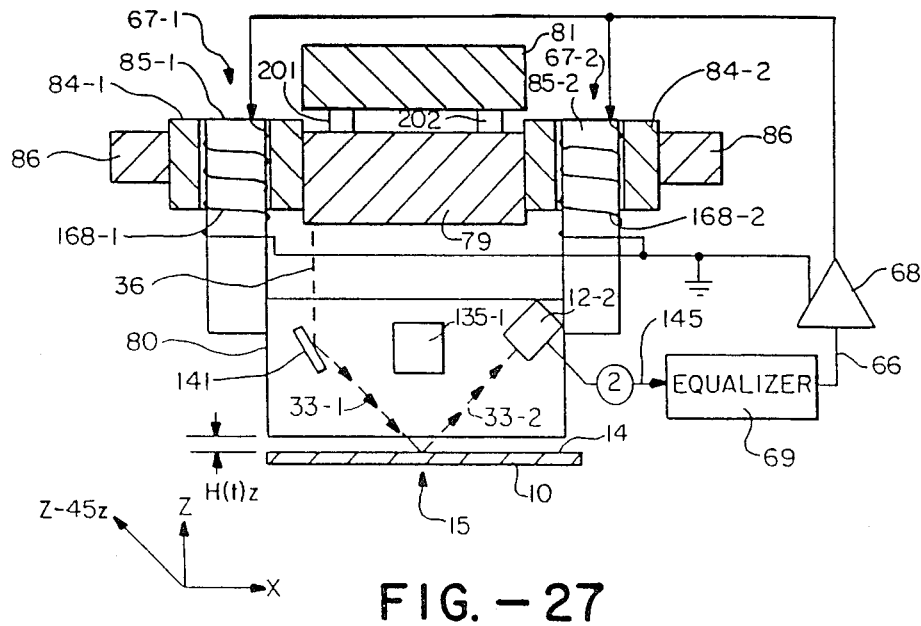
FIG.—27

OPTICAL TURNTABLE SYSTEM WITH REFLECTED SPOT POSITION DETECTION

BACKGROUND OF THE INVENTION

The present invention is directed to methods and apparatus to non-destructively read and play the audio signal of a standard vinyl phonograph record. Specifically, the present invention relates to audio systems which employ light beams and optics, rather than a mechanical stylus, to follow the spatial modulations of the record groove.

Conventional analog audio records are made of vinyl records which store information in the grooves. The grooves are typically formed as left and right walls cut into a master disk with a mechanically vibrating stylus. The physical geometry of the left and right groove walls, known as modulations, carry the audio waveform as recorded information. Many conventional vinyl records are reproduced from the master disk.

A record is played with a device commonly known as a "pick-up." Typically, a stylus or needle is mounted in the pickup, and lowered into the groove, which acts as a guide for the stylus to follow. The stylus is in physical contact with the groove. As the record is rotated on a turntable, the changes in the right and left groove wall geometries, that is, the surface displacements, cause the stylus to vibrate. The stylus vibrations are then converted into electrical signals that are delivered to the input of an amplifier.

Conventional analog recording and reproduction systems have several inherent flaws. Imperfections in the recording medium and in the reproduction system can alter the playback waveform and distort the sound. Conventional reproduction systems are sensitive to "ticks" and "pops" caused by imperfections or dust particles in the grooves, surface scratches and low frequency noise caused by the system's physical vibration. In addition, since the stylus is in physical contact with the record groove, record wear (typically in the form of pits in the groove walls) is inevitable. Lastly, since conventional reproduction systems are mechanical, inertia affects the response characteristics.

In recent years, there has been research into and development of optical recording and reproduction systems. In general, digital reproduction systems use laser sources (coherent light) to detect the presence or absence of reflected light from recorded "pits" along a track. These digital systems require recording, processing and reproduction techniques very different from those for the conventional analog record. The use of light and optics to play conventional analog records has largely been ignored or found to be unsatisfactory.

U.S. Pat. No. 4,363,118 (Roach et al) entitled "Sound Carrier Amplitude Measurement System" describes the use of optical detection systems to provide an estimation of signal depression depth of spiral grooves for video disk records. Video disks are different from conventional analog recording disks as shown by the following comparisons:

| Video Disk | Conventional Analog Record |
| --- | --- |
| 9500 grooves/inch | 250 grooves/inch |
| 140° V groove | 90° V groove |
| 0.5 microns depth | 50 microns depth |
| FM encoded | AM encoded |

In the Roach patent, a diffraction pattern is used to view a plurality of grooves in order to determine nominal groove depth of the illuminated region, rather than to extract encoded data, as is the purpose of the present invention. The diffraction pattern of Roach does not provide extractable data about the individual grooves observed and therefore cannot be used to reproduce sound.

U.S. Pat. No. 3,327,584 (Kissinger) entitled "Fiber Optic Proximity Probe" describes a fiber optic proximity probe used to measure very minute shaft rotation, vibration or displacement, stress or strain, surface testing, and rotation counting but not for extraction of audio data.

Reissued U.S. Pat. No. 30,723 (original U.S. Pat. No. 3,992,593) to William K. Heine entitled a "Disc Phonograph Record Playback by Laser Generated Diffraction Pattern" plays conventional disc phonograph records using a laser and means for detecting the resulting interference-diffraction pattern of arcs of light. The Heine patent is limited to the analysis of interference-diffraction patterns and is not believed to provide an entirely satisfactory system.

While the use of optics in connection with phonograph records and video disks has been proposed in one form or another, a satisfactory and economical optical system for the optical playback of conventional phonograph records is still not available.

In light of the above background, there is a need for an improved, economical optical turntable system capable of playing conventional phonograph records.

SUMMARY

The present invention is an optical turntable system for optically playing phonograph records without mechanically contacting the records and therefore without causing wear to the records. The phonograph record has a recorded signal in a groove where the groove is formed by at least a first wall having a position modulated by the recorded signal. An optical unit includes an optical source providing a first light beam incident onto the wall to provide a reflected beam from the wall at a reflected angle proportional to the recorded signal. The optical unit also includes an optical sensor for sensing the reflected angle of the reflected beam to provide an output data signal proportional to the recorded signal. A drive assembly moves the record relative to the optical unit.

The optical unit is partitioned into a data extraction unit and a tracking assembly. The tracking assembly functions to position the optical unit over the section of the groove of interest as the record turns. The optical unit employs optical detectors so that contact with the record is not required either for data extraction or for tracking.

In a conventional record, the groove is formed by a first wall and by a second wall where the first wall and the second wall intersect at an angle of approximately 90 degrees. Each of the walls intersect at an angle of approximately 45 degrees with respect to a plane formed by the surface of the record. In the optical unit, a first detector includes a first optical source to provide a first light beam incident onto the first wall which provides a first reflected beam to a first sensor. A second detector includes a second optical source to provide a second light beam incident onto the second wall which provides a second reflected beam to a second sensor.

In one embodiment, the tracking assembly includes a vertical unit for positioning the optical unit a predetermined height from the record, includes a lateral unit for lateral positioning, and includes a tangential unit for tangential positioning. The lateral unit has a lateral detector for detecting the lateral position of the groove and for providing a lateral error signal as a function of the lateral displacement of the light beam relative to the groove. A lateral servo is responsive to the lateral error signal for tracking the light beam in the groove. The lateral detector includes a first detector for providing a first detector signal for indicating the lateral position of the first wall and includes a second detector for providing a second detector signal indicating the lateral position of the second wall. An electronic circuit is provided for processing the first detector signal and the second detector signal to provide the lateral error signal.

The primary advantages of using light and optics in the present invention include low mechanical inertia (leading to better sound reproduction), non-contact with the record surface(and consequently no record wear and no requirement for stylus replacement), and the ability to play old records. Additional advantages from using light and optics include electrostatic immunity, rumble immunity, and acoustic feedback immunity.

In accordance with the above summary, the present invention achieves the objective of providing an improved turntable system capable of providing superior data extraction and playing of conventional records using light and optics.

The foregoing and other objects, features and advantages of the invention will be apparent from the following detailed description in conjunction with the drawings.

BRIEF DESCRIPTION OF THE DRAWINGS

FIG. 1 depicts a schematic representation of the optical turntable system of the present invention.

FIG. 2 represents a isometric schematic representation of the FIG. 1 system.

FIG. 9(A) depicts a isometric view of groove sections on a record and the data detector utilized for detecting the left wall of a groove.

FIGS. 9(B), 9(C) and 9(D) depict $XY_{+45z}$ views of the groove wall and angle made by the groove wall tangent plane with the X-axis.

FIG. 17 is a isometric view of the incident light spot on the left wall of a groove section.

FIG. 18 depicts left and right wall detectors positioned symmetrically above the left and right walls of a groove section together with the incident and reflected beams.

FIG. 19 depicts the reflected portion of the light spots from the orientation of FIG. 18.

FIG. 20 depicts the groove section 21 moved in the Y-axis direction relative to the incident light rays of FIG. 18.

FIG. 21 depicts the reflected portion of the light spots from the orientation of FIG. 20.

FIG. 22 depicts the light rays relative to the groove section 21 of FIG. 18 moved in the opposite direction relative to the groove section in FIG. 20.

FIG. 23 depicts the reflected portion of the light spots from the orientation of FIG. 22.

FIG. 24 depicts a YZ-plane schematic representation of the tracking assembly of FIG. 1 as positioned above a phonograph record.

FIG. 27 depicts an XZ-plane schematic representation of the data and height tracking assembly of FIG. 1 and FIG. 24.

Figure 3:
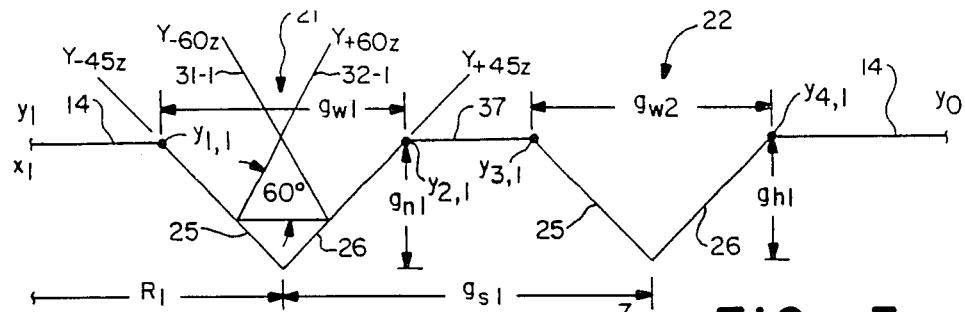
FIGS. 3 through 5 depict schematic cross-sectional views in the ZY plane of groove sections of a phonograph record.

DETAILED DESCRIPTION 1.1 Overall System (FIGS. 1–2)

In FIG. 1, the optical turntable system 8 is adapted to sense (play) the phonographic record 10. The record 10 has its top surface 14 lying in the XY plane which is normal to the YZ plane of the paper. The record 10 is rotated relative to the optical sensing region 15 by the drive assembly 11. The sensing region 15, which lies generally on and into the top surface 14 of record 10, is sensed optically by the data and tracking assembly 9 by means of the incident light rays 16 and the reflected light rays 17.

In order to obtain accurate reproduction of the recorded data on record 10, the height, $H(t)_z$, of the record surface 14 relative to the optical plane 5 of the assembly 9 is detected and controlled in the vertical (Z-axis) direction. Similarly, the sensing region 15 translates, relative to the central axis 6 of the record 10, in the lateral (Y-axis) direction in order to follow the spiral groove in the record 10 as record 10 rotates.

In FIG. 1, the assembly 9 includes a vertical unit 29, a lateral unit 30, a tangential unit 34 and detectors 2. The vertical unit 29 functions to detect and control the Z-axis height, $H(t)_z$, of the assembly 9. The lateral unit 30 functions to detect and control the Y-axis, lateral position of assembly 9. As the record 10 rotates, the tangential unit 34 functions to detect and compensate for variations in the X-axis direction of record 10. The detectors 2 include detectors for detecting data (sound) signals and for detecting tracking signals from the record 10.

In FIG. 2, a three dimensional isometric view of the record 10 relative to an XYZ coordinate system is shown. The surface 14 of the record 10 generally lies in the XY plane. The drive assembly 11 drives the record 10 in the clockwise direction when viewing the XY plane in the negative Z-axis direction.

In FIG. 2, various parts of the assembly 9 of FIG. 1 are shown. The height detector 12 and the wall detectors 13 in FIG. 2 are parts of the detectors 2 of FIG. 1. In FIG. 2, detector 12 is represented as a height source 12-1 and a height sensor 12-2. The detectors 13 include the left wall detector 13-1 and the right wall detector 13-2.

The record 10 has a spiral groove 20, formed into surface 14, which varies in width and depth. These variations in the groove represent the recorded data signal. The sensing region 15 defines the location where the rays 16, focused by the detectors 2, form small optical spots.

In FIG. 2, the height source 12-1 transmits the rays 33-1 to the sensing region 15 and the reflected rays 33-2 are sensed by the height sensor 12-2. The height detector 12 is utilized to detect the height, $H(t)_z$, of the surface 14 relative to the optical plane 5 of the tracking assembly 9 (see FIG. 1) and provides a control signal on lines 145 to the vertical unit 29 of FIG. 1 which functions to maintain the height, $H(t)_z$, a constant.

In FIG. 2, the left wall detector 13-1 generates the incident rays 31-1, which are incident on the sensing region 15, and receives the reflected rays 31-2 from region 15. Similarly, the right wall detector 13-2 transmits the incident rays 32-1 onto the sensing region 15 and receives back the reflected rays 32-2.

Groove section 21 has a left groove wall 25 and a right groove wall 26 (see FIG. 3). In this description, the designations "left" and "right" are given as if the groove section were being viewed in the negative X-axis direction. Of course, the viewing in this direction is arbitrary and the orientation could be as if the groove section were being viewed in the positive X-axis direction, in which case the left and right designations would be reversed.

The rays 31-1, 32-1, and 33-1 of FIG. 2 correspond to the incident rays 16 in FIG. 1 and the rays 31-2, 32-2, and 33-2 in FIG. 2 correspond to the reflected rays 17 in FIG. 1.

With the coordinate system of FIG. 2, the tangential or in-track direction of the groove 20 within the sensing region 15 is generally parallel to the X axis. Similarly, the lateral direction of the groove 20 within the sensing region 15 is generally in the Y-axis direction.

For purposes of explanation, different sections of the groove 20 within the proximity of the sensing region 15 are examined. In FIG. 2, two short and adjacent sections 21 and 22 of the groove 20 are analyzed when the record 10 has been rotated to have the section 21 within the sense region 15. Each section, like section 21, is uniquely defined by its Y-axis dimension when rotated within the sensing region 15. In FIG. 2, the center of the record 10 is located at $x_c$, $y_c$. The displacement along the Y-axis of the sensing region 15 relative to the center 18 of the record 10 is given as a radial location, $R_y(t)$, where y has a different value for each different section of the groove 20 and is a function of time, t.

In FIG. 3, three different sections of the groove 20 appear at radial locations $R_1$, $R_2$, and $R_3$. The first section at $R_1$ is designated as the section 21 of FIG. 2 and is examined when that section has rotated to the sense region 15. The sections $R_2$ and $R_3$ are at locations counterclockwise from the section 21 in FIG. 2, for example at 21' and 21'', respectively.

Groove Geometry (FIGS. 3–6)

In FIG. 3, a 90°-cross-sectional view of the groove sections 21 and 22, lying in the YZ plane and normal to the X-axis is shown. The FIG. 3 view represents the groove 21 at some X-axis location, $x_1$. Within the XYZ coordinate system of FIG. 2, the X-axis coordinate within the sensing region 15 is generally a constant and it is the record 10 that rotates. However, for purposes of analysis in the sensing region 15, each section of groove 20, defined by a different $R_y(t)$ value, can be considered for identification purposes as having a different X-axis value. For example, the groove sections 21, 21', and 21'' having radii $R_1$, $R_2$ and $R_3$ can be identified as having coordinates $x_1$, $x_2$ and $x_3$, respectively, which represent the successive rotation of the sections into the sensing region 15.

The light rays 31-1 are incident at an angle of approximately 60° (along the axis $Y_{+60z}$) relative to the XY-plane. Similarly, the rays 32-1 are incident on the right wall 26 at an angle of approximately 60° (along the $Y_{-60z}$ axis) relative to the XY-plane. Angles over the range from 55° to 69° have been found to be generally acceptable for incident rays. With respect to an axis $(Y_{+45z})$ normal to the plane of wall 25, the incident angle, $\phi_2$, is preferably 15 degrees and ranges from 10 to 24 degrees.

The recorded data (sound) signal is represented by the velocity of the groove walls 25 and 26 as measured in the $Y_{\pm 45z}$-axis directions. The $Y_{\pm 45}$-axis velocity can be measured anywhere, for example, at the record surface 14 or along the groove walls 25 and 26 down, in the Z-axis direction, from the surface 14.

In FIG. 3, the groove section 21 is positioned beneath the detectors 2 of FIG. 1 so that the incident rays 31-1 and 32-1 are not incident upon the groove section 22.

In FIG. 3, the groove section 21 has a typical width, $g_{wl}$, of 70 micrometers. The width, $g_{wl}$, is measured by the difference between two Y-axis coordinates $y_{1,1}$ and $y_{2,1}$. A typical groove-to-groove spacing, $g_{sl}$, between typical groove sections 21 and 22 is 100 micrometers. The area 37 between groove sections is called the "land". In operation, the groove walls 25 and 26 rotate in the XY plane about the record center 18(see FIG. 2). The change in the width, $g_w$, as measured in the sensing region 15 along the Y-axis is denominated "$d_y$" and is in the Y-axis direction at right angles to the in-track X-axis coordinate of the groove. The change in the left wall 25 as measured along an axis $Y_{+45z}$ with respect to the X-axis is denominated $dy_{+45z}/dx$. The change in the right wall 26 as measured along an axis $Y_{-45z}$ with respect to the X-axis is denominated $dy_{-45z}/dx$. The groove velocity, $dy_{+45z}/dx$, for the left wall 25 and, $dy$-$45z/dx$, for the right wal 26 represents the recorded data signals. For clarity, the $dy_{\pm 45z}$ values are designated $\overline{dy}$.

Figure 4:
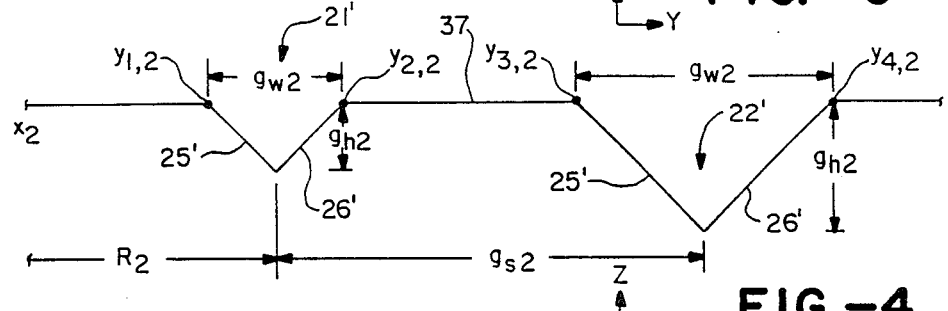

In FIG. 4, the groove sections 21' and 22', located counterclockwise from the groove sections 21 and 22 of FIG. 3(see FIG. 1), are shown. The width of the groove section 21', $g_{w2}$, is smaller than the width, $g_{w1}$, for the groove section 21. Similarly, the groove section 22' is the same size as the groove section 22 but the groove section 22' has been translated in the positive Y-axis direction.

Figure 5:
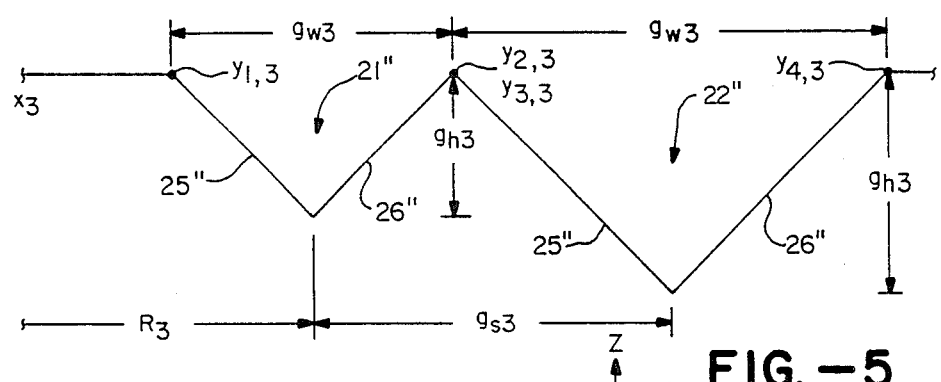

In FIG. 5, the groove sections 21" and 22" are shown and again are sections which are located counterclockwise from the sections 21, 21', 22, and 22', respectively. Both the widths, $g_{w3}$, of groove section 21" and 22" are larger than the widths, $g_{w1}$ and $g_{w2}$, in FIGS. 3 and 4. The changes in widths in the Y-axis direction of the groove walls 25 and 26 as represented in FIGS. 3 through 5 represent the signal modulation which is to be detected by the optical system of the present invention.

Note that as the groove width, $g_w$, increases, the groove height, $g_h$, increases accordingly. In monophonic (single channel) operation, the groove walls 25 and 26 do not change independently in the Y-axis direction. Accordingly, the transition from groove section 22 of FIG. 3 to groove section 22' of FIG. 4 can represent a monophonic change. By way of contrast, the change from groove section 21' in FIG. 4 to groove section 21" in FIG. 5 has the groove walls 25' and 26' moving in unequal and opposite directions.

Stereo groove motion for two channels consists of separate modulation of each of the groove walls 25 and 26 (from section 21 in FIG. 3 to section 21' in FIG. 4). When both channels are equal and in phase, the motion is lateral, the same as for monophonic. When the signals are equal and out-of-phase(from 21 in FIG. 3 to 21' in FIG. 4), the motion is vertical. The convention of having in-phase stereo signals produce lateral motion allows a stereo system to be compatible with mono records.

Monophonic operation is represented by the groove sections 22 and 22' in FIG. 3 and FIG. 4 respectively. In FIG. 3, the groove width $g_{w1}$ with a groove 21 is greater than the groove width $g_{w2}$ for the groove 21' of FIG. 4. The change in width from the groove 21 to the groove 21' is accompanied by a change in the groove height $g_{h1}$ for groove 21 to a shorter groove height $g_{h2}$ for the groove 21'.

For stereophonic operation with two channels, the left side wall 25 represents one channel and the right side wall 26 represents the other channel. The left and right channels operate independently. In order to play each channel, the lateral movement of each of the side walls 25 and 26 in the Y-axis direction must be detected. Examples of the stereophonic operation are observed by comparison of the groove sections 21' and 21" of FIGS. 4 and 5 respectively. Similarly, stereophonic operation is observed in connection with the groove sections 22, 22' and 22". The transition from groove 22 of FIG. 3 to the groove 22' of FIG. 4 does not change the groove height since $g_{h1}$ and $g_{h2}$ are both equal. Similarly, the groove 22 width $g_{w1}$ is equal to the groove 22' width $g_{w2}$. Although the groove height and width has remained the same, both the groove walls 25' and 26' have been translated in the Y-axis direction relative to the groove walls 25 and 26 of FIG. 3. Similarly, the groove walls 25' and 26' in FIG. 4 have been translated in opposite directions to arrive at the positions for the walls 25" and 26" in FIG. 5.

Figure 6:
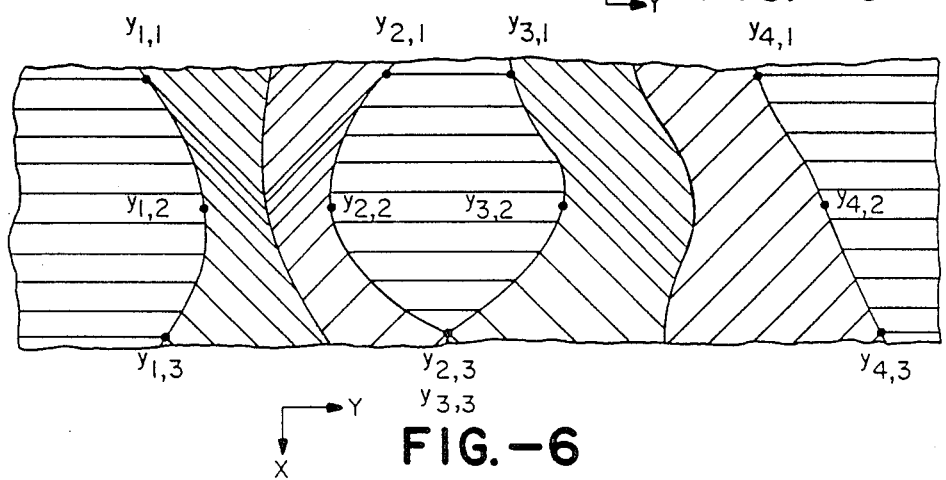
FIG. 6 depicts a schematic top view of the groove sections of FIGS. 3 through 5.

In FIG. 6, a top view of the groove sections of FIGS. 3–5 are shown looking negatively along the Z-axis at the XY plane.

The spatial resolution requirement of a record is determined by the encoded dynamic range (about 50dB) of the record. This range corresponds to an amplitude dynamic range of approximately 320. The spatial resolution required to capture all of the stored information is therefore the average groove width(70 micrometers) divided by the range(320) or about 0.2 micrometers.

The positional modulation of the groove wall-(velocity encoding) in a record does not occur directly from the signal to be recorded since the low and high frequency bands are first processed with RIAA equalization. The RIAA equalization provides a compromise between the large velocity range that would be required for amplitude encoding(1000 to 1) and the waste of valuable recording space that would be sacrificed if only unequalized velocity encoding were used. RIAA equalization provides for a deemphasis in recording for low frequencies and a preemphasis in recording for high frequencies. Complementary equalization is used to correct upon playback.

The groove pitch is defined as the density of groove sections along a radial axis (Y-axis) of the record, such as axis 28 in FIG. 2. Groove sections are made narrower and spaced closer together when the signal level is low, and the sections are deepened and spaced farther apart when the signal level increases.

Figure 7:
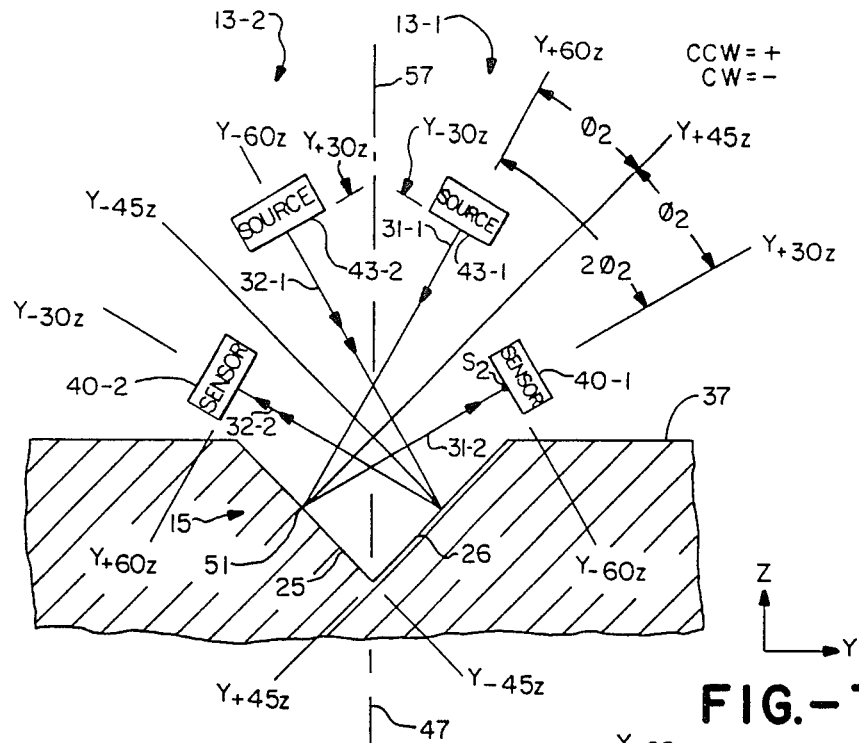
FIG. 7 depicts a schematic cross-sectional view of a groove section and the left and right wall detectors.
Figure 8:
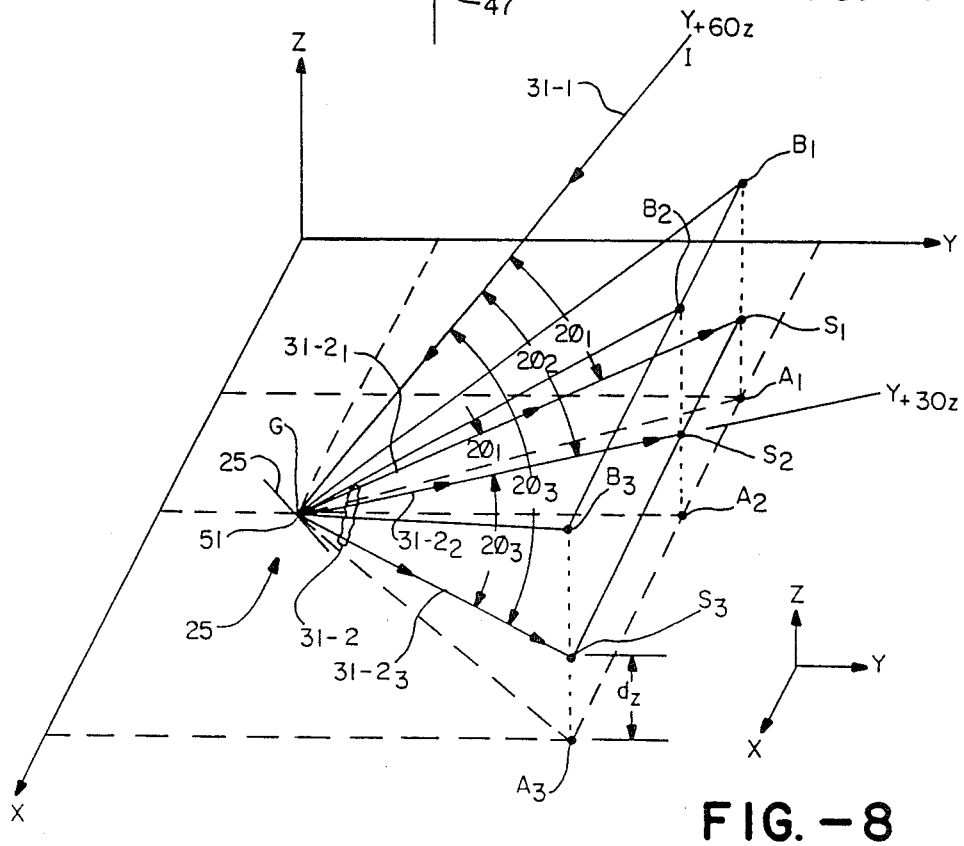
FIG. 8 depicts a isometric view of the light rays for the left wall detector for three different surface angles for the left wall.

Wall Detectors (FIGS. 7-9)

In FIG. 7, the left wall detector 13-1 includes an optical source 43-1 and an optical sensor 40-1. Similarly, the right wall detector 13-2 includes the source 43-2 and the sensor 40-2.

Light from the source 43-1 is incident along the $Y_{+60z}$-axis and impinges in the region 15 onto the left wall 25 at a spot having a center point 51. The reflected beam 31-2 is along the $Y_{+30z}$-axis and is incident on the sensor 40-1 at the spot center $S_2$.

The axis $Y_{+45z}$ is normal to the left wall 25 at the point of incidence 51. The incident beam 31-1 is at an angle $\phi_2$ with respect to the normal $Y_{+45z}$-axis. Accordingly, the reflected angle of the beam 31-2 is also at an angle $\phi_2$ with respect to the normal axis $Y_{+45z}$. The angle between the incident beam 31-1 and the reflected beam 31-2 is $2\phi_2$. In the embodiment described, $\phi_2$ is 15° and hence $2\phi_2$ is 30°. The same condition applies for the right wall detector, that is, the reflected beam 32-2 is 30° from the incident beam 32-1.

While a preferred embodiment has the incident light beams along the $Y_{+60z}$ and $Y_{-60z}$ axes with the reflected light beams along the $Y_{+30z}$ and $Y_{30z}$ axes, the sources and sensors may be interchanged in an alternate embodiment. With such an embodiment, the incident light beams are at $Y_{+30z}$ and $Y_{-30zy}$ and the reflected beams are at $Y_{+60z}$ and $Y_{-60z}$, respectively.

In FIG. 8, further details of the incident and reflected beams for three different groove wall angles of the left wall 25 are shown. The incident beam 31-1 lies in the IGA$_2$ plane which is parallel to the YZ plane of FIG. 7. The reflected beam 31-2$_2$ extends to the spot center S$_2$ which is also in the IGA$_2$ plane. The angle 2$\phi_2$ between the incident beam 31-1 and the reflected beam 31-2$_2$ is the same as shown in FIG. 7. The reflected ray 31-2$_2$ results under the condition that the wall 25 is positioned such that its slope at the point G is normal to the IGA$_2$ plane.

As the wall 25 is translated in the X-axis direction relative to the point 51 of incidence G of the incident rays 31-1, the plane containing the wall 25 has different angles with respect to the IGA$_2$ plane. In effect, the plane of wall 25 rotates about a line which is the intersection of the Y$_{-45z}$ plane and the IGA$_2$ plane so as to form different angles. When rotated in one direction, the reflected ray 31-2$_1$ is formed which terminates in the spot center S$_1$. Note that the spot center S$_1$ has nominally the same Z-axis dimension, d$_z$, as the spot center S$_2$ but that S$_1$ does not lie in the IGA$_2$ plane. The angle between the incident beam 31-1 and the reflected beam 31-2$_1$ is 2$\phi_1$.

In a similar manner, when the left wall 25 is translated in the X-axis direction such that the groove wall angle is in the opposite direction, the reflected beam is 31-2$_3$ which terminates in the spot center S$_3$. The spot S$_3$ does not lie in the plane IGA$_2$. The angle between the incident beam 31-1 and the reflected beam 31-2$_3$ is 2$\phi_3$. As can be observed from FIG. 8, the angle of the reflected beam changes as a function of the surface slope of the left wall 25 at the point G of incidence of the incident beam 31-1.

Referring to FIGS. 8 and 9(A) through 9(D), the groove wall angle, $\theta$, is present in any of a number of planes. Referring to FIG. 8, the angle appears in the Y$_{+45z}$ plane which extends through the line B$_1$b$_2$b$_3$ and the point G. This plane is normal to the groove wall 25 and extends through the point 51. The groove wall velocity is defined as the rate of change of the groove wall angle, $\theta(t)$, with respect to time as measured in the Y$_{+45z}$ plane B$_1$B$_2$B$_3$G. The groove wall angle also can be measured as the projection of the incident rays 31-1 and the reflected rays 31-2 onto other planes. For example, as indicated in FIG. 8, the Y$_{+30z}$ plane S$_1$S$_2$S$_3$G includes the groove wall reflection angle 2$\theta$(t) which equals 2$\theta_1$ the reflected rays 31-2$_1$ and 2$\theta_3$ for the reflected rays 31-2$_3$. The reflection angle, 2$\theta$(t), is twice the groove wall angle, $\theta$(t).

In FIG. 9(A), a sensor 40-1 is positioned to receive the reflected light rays 31-2 from the left wall 25. The light rays 31-1 from the source 43-1 are incident upon the left wall 25 of the groove 21 at the spot center 51. The spot center 51 is within the sensing region 15 (see FIGS. 1 and 2). The reflected rays 31-2 are incident on the sensor 40-1 at spot center 39 of spot 44.

The sensor 40-1 is a conventional position sensing device (PSD). Sensor 40-1 has output lines 54 which include a first output line 54-1 and a second output line 54-2. The current on each of the lines 54-1 and 54-2 is proportional to the intensity of the incident spot 44 and the closeness of the spot center 39 to the X-axis ends 45-1 or 45-2, respectively, of sensor 40-1. With the spot 44 positioned as shown in FIG. 9(A), the current, I$_2$(t), in line 54-2 is greater than the current, I$_1$(t), in line 54-1. The sum of the currents, I$_1$(t)+I$_2$(t), is proportional to the intensity of spot 44 at any time, t, while the difference of the currents, I$_1$(t)−I$_2$(t), is proportional to the position of spot center 39 at any time, t, along the X axis relative to the center point, S$_2$.

As hereinafter described, the output currents I$_1$(t) and I$_1$(t) are converted to voltages V$_1$(t) and V$_2$(t) and processed to form a sum signal, V(t)+V2(t), proportional to the intensity the incident spot 44 and to form a difference signal, V$_1$(t)−V$_2$(t), proportional to the position of spot center 39. The sum and difference signals are further processed by the division [V$_1$(t)−V$_2$(t)]/[V$_1$(t)+V$_2$(t)], to form the processed sensor output signal, V(t), which is independent of spot intensity and is strictly a function of spot position on the PSD 40-1.

In FIG. 9(A), the spot center 51 is selected for purposes of explanation as being at the groove section 21" of FIG. 5. The angle of reflection between the incident rays 31-1 and the reflected rays 31-2 is 2$\phi$(t). The angle $\phi$(t) changes as a function of the angle of the groove wall 25 at the spot center of incidence 51. As the record 10 is moved, essentially in the X-axis direction with time, t, the spot center 39 of the rays 31-2 on the sensor 40-1 moves in the X-axis direction. Therefore, the displacement, d(t), of the spot center 39 along the sensor 40-1 varies as the angle 2$\theta$(t). The output signal on the lines 54 from sensor 40-1 is proportional to the displacement, d(t), which in turn is proportional to the angle 2$\theta$(t).

The recorded data encoded for each channel is the signal velocity, V$_s$(t), of each of the respective groove walls, that is, the change in the Y$_{+45}$-axis and Y$_{-45}$-axis dimensions, dy$_{+45}$ and dy$_{-45}$, with respect to time, dt, for the left and right groove walls for the groove section within the sensing region 15. The changes for the left wall 25 are along the Y$_{+45z}$-axis while the changes for the right wall 26 are along the Y$_{-45z}$-axis. However, as indicated in FIGS. 7 and 8, the sensing for the left wall 25 and right wall 26 are actually made along the Y$_{+30z}$ and Y$_{-30z}$ axes, respectively. In addition, a tangential velocity, V$_T$(t), exists due to the constant rotation rate, $\omega$, and the radial position, R$_y$(t), of the groove section of interest. The tangential velocity is a change in the X-axis dimension, dx, as a function of time, dt.

In FIG. 9(B), a plane 162 is normal to the XY$_{+45z}$ plane and is tangent to the left wall 25 at the incident point 51. The plane 163 is normal to the XY$_{+45z\ plane}$ and is normal to the tangent plane 162. The groove wall angle, $\theta$1, is the angle between the tangent plane 162 and the X-axis plane 164 which is normal to the XY$_{+45z}$ plane. The incident light rays 31-1 form the angle, $\Phi_1$, with the normal plane 163 and the reflected rays at 31-2$_1$ form the same angle, $\phi_1$, with the normal plane 163 because the angle of incidence is equal to the angle of reflection. Accordingly, the angle between the projection of the incident rays 30-1 into the XY$_{+45z}$ plane and the projection of the reflected rays 31-2$_1$ into the same plane is equal to twice the groove wall angle, that is, is equal to 2$\theta_1$.

In FIG. 9(C), the orientation is shown such that the incident rays 31-1 and the reflected rays 31-22 all lie in a plane which is normal to the XY$_{+45z}$ plane and includes the Y$_{+45z}$ axis such that the groove wall angle, $\theta_2$, is equal to zero, that is, the tangent plane 162 is parallel to the X-axis.

In FIG. 9(D), the groove wall angle, $\theta_3$, is in an orientation which is clockwise relative to the orientations in FIGS. 9(B) and 9(C). Again, the angle, 2$\theta_3$, lies between the projections of the incident rays 31-1 and the reflected rays 31-2₃ onto the XY$_{+45z}$ plane.

In an embodiment of the present invention, an optical sensor 40-1 is placed parallel with the X-axis and so as to receive the reflected rays along the Y$_{+30z}$ plane S$_1$S$_2$S$_3$. The displacements of the incident spots S$_1$, S$_2$, and S$_3$ along the X-axis in the Y$_{+30z}$ plane are a measure of twice the groove wall angle $\theta(t)$ which varies as a function of time.

Data Extraction

The signal velocity, $V_s(t)$, ranges as follows:

Eq. (1) $0 < V_s(t) < 15$ (cm/sec)

Using Eq. (1), the tangential velocity, $V_T(t)$, is determined as follows:

$$\begin{aligned} V_T(t) &= \omega * R_y(t) \\ &= 33.3/60 * 2\pi * R_y(t) \\ &\simeq 3.49 * R_y(t) \end{aligned} \quad \text{Eq. (2)}$$

where, $R_y(t)$ = the radial distance at any time t of the incident spot location as measured from the center of the record For a standard 12 inch format (LP), the play region radius, $R_y(t)$, is bounded by an inner value of 5.85 cm and an outer value of 15 cm. Therefore, from Eq. (2), $V_T(t)$ ranges as follows:

Eq. (3) $20.4 < V_T(t) < 52$ (cm/sec)

The width, P, of the spot 50 (see FIG. 17) in the X-axis dimension must be small compared with the wavelength $\lambda$ of the signal being detected to preserve proper signal bandwidth where $\lambda = V_T(t)/f_s$ and where $f_s$ is the frequency of the signal being detected.

The incident spot 50 has a Gaussian distribution where P is the 1/e$^2$ width. For a width, P, equal to 6 micrometers, the data signal rolloff at 20 KHz is $-3.5$ db due to the spot size relative to the data signal wavelength, $\lambda$, on the records. For a spot width of 1 micrometer, the signal at 20 KHz has no measurable rolloff. For a spot width of 10 micrometers, a $-15$ db 20 KHz rolloff is observed. For widths up to P equal to 12 micrometers, the rolloff equals or exceeds that obtainable by conventional methods such as a mechanical stylus. For high performance operation P can range from 3 to 12 micrometers. The depth of field of the lines is proportional to the square of the spot size.

Therefore, for god frequency response the spot width, P, is as small as possible while for greater depth of field the spot width, P, should be as large as possible. A spot width of 6 micrometer has been found to be a good compromise between depth of field and frequency response.

The spot width, Q, measured in the Y$_{-45z}$ dimension is typically 22 micrometers. The truncation (blocking) of the reflected beam is generally about 10%.

The groove wall angle $\theta(t)$ is computed $$\begin{aligned} \theta(t) &= \tan^{-1}[dy/dx] \\ &= \tan^{-1}[dy/dt/dx/dt] \\ &= \tan^{-1}[V_s/V_T] \end{aligned} \quad \text{Eq. (4)}$$

where:

$d\bar{y}/dt = V_s(t) =$ signal velocity
$dx/dt = V_T(t) =$ tangential velocity
$d\bar{y} = dy_{+45}$ or $dy_{-45} =$ wall movement Eq. (5) $\theta(t) = \tan^{-1}[V_s(t)/V_T(t)]$ where, $V_s(t) \simeq f(f_s) =$ some function of $f_s$
20 Hz $< f_s <$ 20 KHz A position sensing detector (PSD), sensor 40-1 in FIG. 9(A), is used to sense the dynamically changing specular beam reflection angle, $2\theta(t)$, of reflected light 31-2 from the groove wall 25. This sensor 40-1 generates currents I(t) on lines 54 which are converted to voltages, V(t), corresponding to the location of the center 39 and the size of the light spot 44 incident on the sensor 40-1 surface and resulting from the reflected light 31-2.

Sensor 40-1 is oriented to measure the position of spot 44 formed by the reflected beam 31-2 at the reflected angle $2\theta(t)$. Sensor 40-1 measures the position of spot 44 in the tangential (X-axis) direction. Such measurement is proportional to the lateral (Y-axis) motion of the groove wall 25.

The sensor 40-1 offers a greater than four decade dynamic range, low cost and the ability to sense the center of a light spot area and therefore has no significant sensitivity to the spot non-uniformity.

Assuming ideal conditions, $$\begin{aligned} V(t) &= C * d(t) \\ &= C * [h(t) * \tan 2\theta(t)] \end{aligned} \quad \text{Eq. (6)}$$

where,

C = arbitrary constant (volts/mm)
h(t) = distance of PSD from groove wall(mm)
d(t) = displacement from reference of light incident spot (mm)
V(t) = processed sensor output signal.

In terms of the encoded velocity, the data output signal, V(t), of the data extraction method is as follows:

Eq. (7) $V(t) = C*h(t) \tan[2 \tan^{-1}(V_s(t)/V_T(t))]$

For small values of an angle, the following equations apply:

Eq. (8) $\tan^{-1}[\alpha] \simeq [\alpha]$

Eq. (9) $\tan^2[\alpha] \simeq 0$ $$\begin{aligned} \tan[2\alpha] &= 2\tan[\alpha/[1 - \tan^2(\alpha)]] \\ &\simeq 2\tan[\alpha] \\ &\simeq 2\alpha. \end{aligned} \quad \text{Eq. (10)}$$

Using Eqs. (8–10) for the small angle, $V_s(t)/V_{T1(t)}$, Eq. 7 becomes

Eq. (11) $V(t) \simeq C*h(t)*[2V_s(t)/V_T(t)]$.

The harmonic distortion resulting from the assumptions of Eqs. (8–10) for a typical worst-case scenario (at the inner radius and high groove velocity) is only measurable as third order distortion and is quite small ($-33$ dB).

In order to render the signal V(t) independent of the radius, $R_y(t)$, V(t) is multiplied by $R_y(t)$ to form the signal $V(t)_R$ as follows:

Eq. (12) $V(t)R = [V(t)][R_y(t)]$.

Sources of Error For Data Extraction (FIGS. 10-17)

There are several error conditions which potentially can affect the data extraction method. Each of these conditions is analyzed to determine its noise contribution.

Wall Translation. As the groove wall is sensed, the relative position of the groove wall moves toward and away from the sensor 40-1 due to modulation as will be explained with reference to FIGS. 10-12 which depict the incident and reflected rays in the $XY_{+60z}$ plane.

Figures 10, 11, 12:
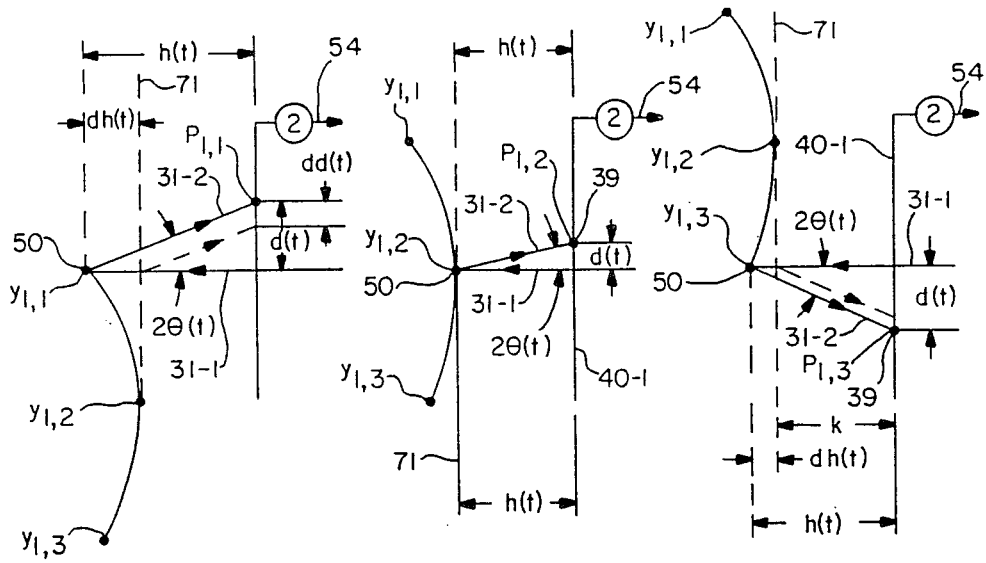
FIGS. 10 through 12 depict $XY_{+60z}$ side views of the left-wall sensor for different $Y_{+60z}$ axis positions of a groove section relative to the sensor.

In FIG. 10 the record has moved so that the spot 50 is at the Y coordinate $y_{1,1}$ with a reflection angle, $2\theta(t)$. The reference line 71 is a constant height, K, in the $Y_{+60z}$ direction from the sensor 40-1. In FIG. 10 the height, h(t), is displaced an amount dh(t) from the reference line 71. The difference in height dh(t) introduces an error term into the signal on lines 54 due to the offset dd(t).

In FIG. 11, the record has moved so that the spot 50 is at the Y coordinate $y_{1,2}$ with a different angle $2\theta(t)$ so that the height, h(t), is equal to the constant, K. The point of incidence of the reflected rays 31-2 at spot 39 is a different value of d(t) representing the change in the angle of reflection, $2\theta(t)$.

In FIG. 12, the reflection angle $2\theta(t)$ and the displacement, d(t), are the same as in FIG. 9(A) and the spot 50 of incidence is at the Y coordinate $y_{1,3}$. The point 50 at the location $y_{1,3}$, is a height dh(t) greater than the constant K of reference line 71.

The error term introduced by the dh(t) component, as indicated in FIGS. 10 through 12, as will now be explained, is insignificant. From Eq. (7), Eq. (13) $V(t) = 2K((V_s(t)/V_T(t))*h(t)$ Eq. (14) $dV(t) = 2K((V_s(t)/V_T(t))*dh(t)$ Eq. (15) $V(t) = 2K((dV(t)/dh(t))*h(t)$ Eq. (16) $dV(t)/V(t) = dh(t)/h(t)$.

Therefore, the error in the measured signal, dV(t)/V(t), is proportional to the error (or variability) in the sensor offset, dh(t)/h(t). The implication of this statement is significant. It means that the angle sensor, the sensor 40-1, is insensitive to displacement in the Y-axis direction. For an extreme noise condition example, h(t)=10 mm, dh(t)=0.05 mm, dh(t)/h(t)=0.005. This example equates to 43 dB error suppression. This insensitivity to groove height variation in the Y-axis direction allows the data extraction method of the present invention to be rumble insensitive.

Tracking Error. Any error in tracking would manifest as a wall translation error as described above. Lateral or vertical error in position also creates an error component in the data extraction dimension. This error is due to the 45 degree view angle of the data extraction system. The significance of the error is the same as described above under the wall translation.

Figure 13:
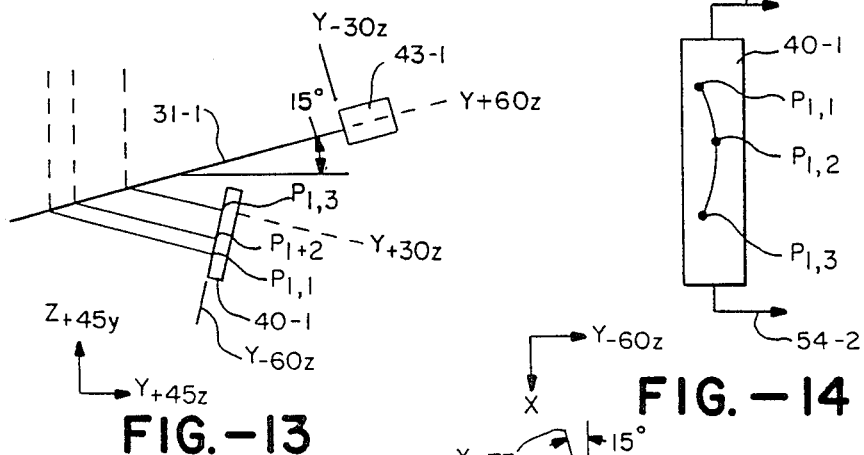
FIG. 13 depicts an end view of the data sensor and its 15° off-axis location relative to the light source.
Figure 14:
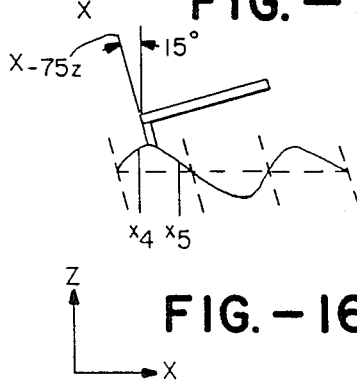
FIG. 14 depicts a front view of a sensor showing the trajectory of received light for different positions of the groove section, of FIGS. 10 through 12.
Figures 15, 16:
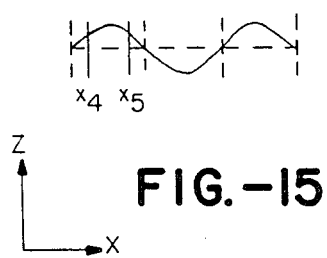
FIGS. 15 and 16 depict the non-incline and the 15° incline of the cutting instrument utilized in forming a groove in records.

Beam Not Normally Incident. To maintain separation between the incident beam 31-1 and the reflected beam 31-2, a 15 degree offset angle form normal is used as indicated in FIG. 13. The effect of this illumination geometry coupled with typical wall modulation is to produce a non-linear arc (instead of a straight line) on the sensor 40-1 as indicated in FIG. 14. This $Y_{60z}$-axis non-linearity represented by the arc connecting the points $P_{1,1}$, $P_{1,2}$, and $P_{1,3}$, is insignificant for sensor 40-1 which senses in the X-axis direction.

While the preferred embodiment utilizes the data sensor oriented in the tangential (X-axis) direction, a laterally (Y-axis) oriented sensor can be employed. For example, the detector 40-1 can be rotated 90° in the FIG. 14 plane to sense the $Y_{-60z}$-axis variations in the positions of spot center points $P_{1,2}$, and $P_{1,3}$. In this alternate embodiment like the preferred embodiment, the reflected beam from the groove wall forms a spot at a spot position proportional to the recorded signal. The sensor 40-1 senses the spot position of the reflected spot thereby tracking the wall modulation.

Vertical Cutting Angle. In the cutting of records the cutting of the stylus is angled forward 6 to 30 degrees, with 15 ($X_{-75z}$) typical, about the Y-axis in the XZ-plane to cause a "plowing" of the excess vinyl out of the groove. This forward cutting angle causes a skewing of the recorded waveform as shown in the skewed waveform of FIG. 16 relative to the non-skewed waveform of FIG. 15. When the skewed signal is played back with a mechanical stylus at the same forward angle, the original waveform is detected properly.

Referring to FIG. 17, the footprint of the optical spot 50 of the present invention, unlike the mechanical stylus, is formed by incident rays in a plane parallel to the YZ plane with no skew angle about the X-axis in the XZ-plane. This absence of a skew angle is permitted in the optical detector described because the phase lead and lag reflection from the reflected rays above and below the center 51 of the target spot 50 in the Z-axis direction tend to cancel each other leaving no significant vertical tracking angle distortion.

The absence of vertical tracking-angle distortion can be understood referring to FIG. 17. In FIG. 17, the left wall 25 of the groove 21 is shown where the spot 50 is located at the Y-axis coordinate $y_{1,1}$. The spot 50 has a center 51 which corresponds to the actual Y-axis coordinate $y_{1,1}$. The actual recorded angle at 15° (along axis $X_{-75z}$) indicates that the spot 50 has a coordinate $y'_{1,1}$ which is forward in the X-axis direction of the coordinate $y_{1,1}$ and a coordinate $y''_{1,1}$ which lags behind the coordinates $y'_{1,1}$ and $y_{1,1}$. The lead by the coordinate $y'_{1,1}$ tends to cancel the lag by the coordinate $y''_{1,1}$. Since the lead and lag tend to cancel, the coordinate $y_{1,1}$ at the center point 51 tends to be the average of all the leading and lagging coordinates. For this reason, the vertical cutting angle can be ignored.

Pits and Scratches. In FIG. 17, the incident light spot 50 from the light beam rays 31-1 is shown on the portion of the left wall 25 of the groove section 21. The spot 50 is located above the location in which the pits and scratches 46 are typically present within the groove and along wall 25. The pits and scratches are the result of wear caused by use of a mechanical stylus and/or caused by the residue left in the bottom of the groove as a result of the manufacturing process. Because the spot 50 is incident generally above the pits and scratches, the present invention is immune from any adverse effects which they would cause when a mechanical stylus is employed.

Lateral Tracking (FIGS. 18–23)

The lateral tracking unit 30 of FIG. 1 utilizes the left wall detector 13-1 and the right wall detector 13-2 in combination for detecting the position of and for the dynamic positioning of the assembly 9 of FIG. 1 in the Y-axis direction. The unit 30 tracks a groove which changes width, $g_w$, by a factor of 10 (25 micrometers to 250 micrometers) and travels over the full radius, $R_y(t)$, of the record 10.

In FIG. 18, the groove section 21 with the left side wall 25 and the right side wall 26 is shown. The incident rays 31-1 have a cross-sectional dimension, $I_l$, which forms the spot 50 of a given area on the left wall 25. The angle of incidence of the rays 31-1 is 60° so that the reflected rays 31-2 are partially blocked by the edge 59 formed by the intersection of the land 37 and the right wall 26. If the left wall 25 is translated in the positive Y-axis direction, then less of the light reflected from the left wall 25 will be blocked by the edge 59 and vice versa. The cross-sectional dimension, $R_l$, represents the non-blocked component of the reflected rays 31-2 that are not blocked by the edge 59 and are, therefore, incident on the sensor 40-1.

In a similar manner, the incident rays 32-1 have a cross-sectional dimension, $I_r$, which are incident upon the right wall 26. The non-blocked component of the reflected rays 32-2 have a cross-sectional dimension, $R_r$, on sensor 40-2 as a function of the amount of rays that are not blocked by the edge 58 formed between the land 37 and the left wall 25.

In FIG. 19, an $XY_{-60z}$ view for the left wall and an $XY_{+60z}$ view for the right wall images of the spots formed by the non-blocked components of the reflected beams 31-2 and 32-2 of FIG. 18 are shown. Because the left wall 25 and the right wall 26 are symmetrically disposed with respect to the light source axis 57 between incident rays 31-1 and 32-1, the heights and areas of the spots $50_l$ and $50_r$ are equal. That is, $R_l$ and $R_r$ are equal.

In FIG. 20, the groove 21, and its center axis 47, have been shifted in the positive Y-axis direction relative to the light source axis 57 while the incident rays 31-1 and 32-1 are the same as in FIG. 18. In FIG. 20, the cross-sectional dimension of the left wall non-blocked component of the reflected rays 31-2 is $R_l$ and is greater than the cross-sectional dimension $R_r$ of the non-blocked component of the reflected rays 32-2 because a greater portion of the incident rays 32-1 are blocked by the edge 58. The position of the light source axis 57 is designated $P_c(t)_y$ and the position of the groove axis 47 is designated $P_g(t)_y$.

In FIG. 21, the different $R_l$ and $R_r$ dimensions for the reflected rays of FIG. 20 are shown.

In FIG. 22, the groove 21 and axis 47 have been shifted in the negative Y-axis direction relative to light source axis 57 and the position in FIG. 18. With this shift, $R_r$ is much greater than $R_l$.

In FIG. 23, the different $R_l$ and $R_r$ dimensions for the reflected spots $50_l$ and $50_r$ of FIG. 22 are shown.

Referring to FIGS. 18 through 23, it is apparent that the relative magnitude of the $R_l$ and $R_r$ dimensions of the nonblocked reflected spots is a measure of the centering of the groove section 21 designated by axis 47 with respect to the center axis 57 of the incident rays 31-1 and 32-1. The sensor 40-1 provides signals on lines 54 which are proportional to the cross-sectional area of the incident input rays. In a similar manner the sensor 40-2 provides signals on lines 53 proportional to the cross-sectional area of the incident rays 32-2. Therefore, the signals on lines 53 and 54 are proportional to the dimensions $R_r$ and $R_l$.

Lateral Tracking Assembly (FIGS. 24 and 27).

In FIG. 24, further details of the lateral unit 30 of FIG. 1 are shown. The unit 30 includes a track unit 81 which is rigidly attached to the frame 7. The track unit 81 supports a sliding carriage 86 which is rigidly attached to the first optical assembly 79 so as to enable the carriage 86 and assembly 79 to translate in the Y-axis direction. The optical assembly 79 and carriage 86 are attached by two rails 201 and 202 (see FIG. 27). The carriage 86 is translated in the Y-axis direction by means of the drive cable 83. The cable 83 connects to carriage 86, extends around pulley 82 and is driven by the motor 78. The motor 78, typically a digitally commanded stepping motor, at any time, t, receives a Y-axis carriage positional command, $V_{c(t)y}$, on lines 75 from the electronics unit 72. The commands from the electronics unit 72 specify a Y-axis position, $P_c(t)_y$, along axis 57 for the carriage 86 and attempt to position axis 57 over the center of the groove section, $P_g(t)_y$, along axis 47 as shown in FIGS. 18 through 24.

In FIG. 24, electronics unit 72 also provides control signals on lines 76 and 77 for controlling X-axis and Y-axis scanners within the optical assembly 79. The assembly 79 moves only in the Y-axis direction and is fixed in the Z-axis direction. The second optical assembly 80 is attached to the first optical assembly 79 by movable shafts 85 (see FIG. 27) so that the assemblies 79 and 80 translate together in the Y-axis direction by movement of carriage 86. The second assembly 80 is movable in the Z-axis direction by the solenoid shafts 85. Light from the first optical assembly 79 designated by rays 38-1 is reflected in a mirror 135-1 to form the left wall incident beam 31-1. Similarly, the incident rays 38-2 are reflected by a mirror 135-2 to form the right wall incident rays 32-1. The incident rays 31-1 are reflected as the rays 31-2 to the sensor 40-1. Similarly, the incident rays 32-1 are reflected as the rays 32-2 to the sensor 40-2. The sensors 40-1 and 40-2 provide the output signals on lines 54 and 53, respectively, which are in turn provided as inputs to the electronics unit 72.

The stepping motor 78, the sensors 40-1 and 40-2, the carriage 86, the optical unit including the optical assemblies 79 and 80, and the electronics unit 72 provide a carriage servo loop for translating the carriage 86 to the Y-axis position (the incident light position, $P_c(t)_y$, along axis 57) commanded by the electronics unit 72. Any difference between the commanded position, $P_c(t)_y$, and the groove position, $P_g(t)_y$, is detected by the left and right wall sensors 40-1 and 40-2 in the manner described in connection with FIGS. 18 through 23.

A difference between the carriage position, $P_c(t)_y$, and the groove section position, $P_g(t)_y$, results in a Y-axis error signal, $V_{err}(t)_y$, in electronics unit 72. The error signal $V_{err}(t)_y$ is proportional to the difference between the positions $P_c(t)_y$ and $P_g(t)_y$.

Figure 25:
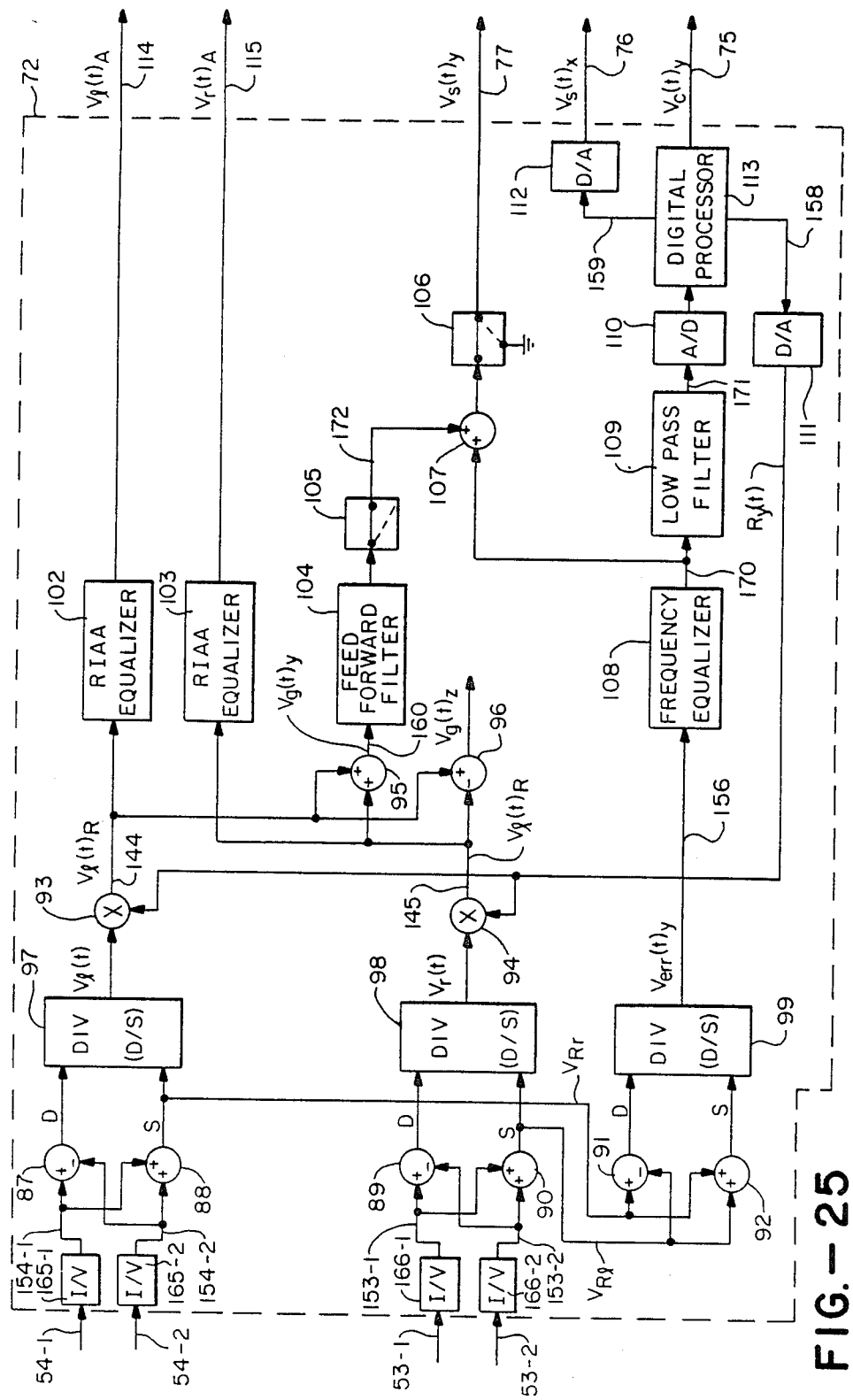
FIG. 25 depicts an electrical schematic of the electronics unit which forms part of the data and tracking assembly of FIG. 24.

Electronics Unit (FIG. 25)

In FIG. 25, further details of the electronics unit 72 of FIG. 24 are shown. The input lines 53 are the two lines from the right wall detector 40-2 of FIG. 24 and connect to current-to-voltage converters 166-1 and 166-2. From converter 166-1, one line 153-1 connects as the plus input to a subtractor circuit 89 and as the plus input to an adder circuit 90. The other of the lines 153-2 connects to the negative input of the subtractor 89 and the other positive input of the adder 90. Circuits 89 and 90 are conventional sum and difference circuits for analog signals. The output signal, $V_{Rl}$, from the sum circuit 90 is proportional to the intensity (and $R_l$) of the incident beam 31-2 on the left wall sensor 40-1. The output signal from the difference circuit 89 is proportional to the position of the center 39 of the incident beam 31-2 as measured along the X-axis in FIG. 9(A) and is intensity (area) dependent.

The sum signal, S, from the adder 90 and the difference signal, D, from the difference circuit 89 are input to the analog divider 98. The divider 98 divides the difference signal by the sum signal thereby providing a right wall output data signal, $V_r(t)$, proportional to the modulation of the right wall. The purpose of the divider 98 is to normalize the difference signal so that the output data signal is rendered independent of variations in intensity of the non-blocked component of the reflected beam. The output data signal from the divider 98 is given by Eq. (11) which for the right wall is denominated as $V_r(t)$.

The data signal for the right wall includes a term, $V_r(t)$, proportional as indicated in Eq. (2) to the radial position $R_y(t)$. The multiplier 94 multiplies the data signal $V_r(t)$ by $R_y(t)$ to form the data signal, $V_r(t)_R$, on line 145 which is independent of the radius, $R_y(t)$, at which the tracking assembly is positioned in accordance with Eq. (12). The data signal on line 145 is proportional to the right wall velocity in the $Y_{-45z}$-axis direction.

The data signal on line 145 from the multiplier 94 connects to the RIAA equalizer circuit 103 and provides the right wall audio signal, $V_r(t)_A$, on line 115.

In FIG. 25, the left wall signals on lines 54-1 and 54-2 connect through converters 165-1 and 165-2. Converter 165-1 has one line 154-1 connected as the positive input to the difference circuit 87 as a positive input to the sum circuit 88. The other signal from converter 165-2 on line 154-2 connects as the negative input to the difference circuit 87 and to the other positive input of the sum circuit 88. The difference signal from circuit 87 connects as one input to the analog divider 97. The sum signal, $V_{Rr}$, from the circuit 88 is proportional to the right wall intensity (and $R_r$) and connects as the other input to the analog divider 97. The analog divider 97 divides the sum signal by the difference signal providing an intensity normalized left wall output data signal, $V_l(t)$, which is proportional to the left wall modulation. The multiplier 93 multiplies tee data signal from divider 97 by $R_y(t)$ to provide the radius-independent left wall data signal, $V_{l(t)R}$, on line 154. The data signal on line 144 is proportional to the left wall velocity in the $Y_{+45z}$-axis direction. The left wall data signal on line 144 is RIAA equalized in circuit 102 to provide the left wall audio signal, $V_l(t)_A$, on line 114.

In FIG. 25, the sum signal, $V_{Rl}$, from the left wall sum circuit 88 and the sum signal, $V_{Rr}$, from the right wall sum circuit 90 are each input to the sum circuit 92 and to the difference circuit 91. The sum signal from the circuit 92 and the difference signal from the circuit 91 are input to the analog divider 99. The analog divider 99 divides the difference, $(V_{Rr}-V_{Rl})$, by the sum, $(V_{Rr}+V_{Rl})$, to provide the amplitude normalized positional error signal, $V_{err}(t)_y$, on line 156 equal to $(V_{Rr}-V_{Rl})/(V_{Rr}+V_{Rl})$ The error signal on line 156 connects to the frequency equalizer 108 which provides the equalized signal on line 170. A low pass filter 107 filters the error signal on line 170 to provide the low pass error signal on line 171. The analog-to-digital converter 110 provides a digital error signal to the digital processor 113. Digital processor 113 in response to the error signal provides a positional command signal, $V_c(t)_y$, on line 75. The converter 110 and processor 113 are convenient when motor 78 (FIG. 24) is digital, but equivalent analog components can be employed. The positional command signal on line 75 commands the stepping motor 78 and carriage 86 in FIG. 24 to the desired Y-axis position $P_c(t)_y$. That Y-axis position is the one which tends to center the carriage and the light sources 43-1 and 43-2 (see FIGS. 18 and 19) such that the center axis 47 of the left and right walls 25 and 26 is colinear with the carriage center axis 57. To the extent that the axes 47 and 57 are not colinear, like shown in FIG. 21 and FIG. 23, the error signal, $V_{err}(t)_y$, from the analog divider 99 of FIG. 25 has a non-zero value which is processed and input to the digital processor 113 so as to command a movement in the Y-axis direction. Such movement and operation tends to servo the carriage 86 of FIG. 24 such that the groove section under the sensing region 15 becomes symmetrically disposed, as shown in FIGS. 18 and 19, and the error signal, $V_{err}(t)_y$, becomes a zero value.

The digital processor 113 also provides on line 158 a digital representation of the radius $R_{y(t)}$ which is input to the digital-to-analog converter 111. Processor 113 establishes the $R_y(t)$ value by resetting to a known position (for example, established by a limit switch - not shown) and incrementing for each step. Converter 111 provides the analog value of $R_y(t)$ as inputs to the multipliers 93 and 94.

The digital processor 113 also provides on line 159 an X-axis position signal to the digital-to-analog converter 112. Converter 112 provides an analog signal, $V_s(t)_x$, on line 76 controlling the X-axis scanner 158 in FIG. 26 to correct for tangential velocity variations due to record hole off-centeredness and/or ellipticity. Processor 113 senses the X-axis runout over one or more revolutions and utilizes the runout so determined in such revolutions to generate $V_s(t)_x$ so as to null the effects of the runout in the next revolution.

In FIG. 25, the data signals on lines 144 and 145 representing $Y_{+45z}$ and $Y_{-45z}$ axis wall velocities are input to the adder circuit 95 and provide a Y-axis groove velocity signal, $V_g(t)_y$. Because lateral motions for left and right walls are in phase, summing the left and right $Y_{+45z}$ and $Y_{-45z}$ data signals will yield the lateral Y-axis component $V_g(t)_y$ since the vertical, out-of-phase Z-axis components tend to cancel. Similarly, the difference circuit 96 yields the vertical (Z-axis) component $V_g(t)_z$ (not utilized in the embodiment described) since the lateral in-phase components of the $Y_{+45z}$ and the $X_{-45z}$ data signals will tend to cancel.

The lateral velocity signal, $V_g(t)_y$, on line 160 is processed in the feed forward filter 104 (AC-coupled integrator) and is connected through a switch 105 to the sum circuit 107. The sum circuit 107 sums the integrated velocity signal from filter 104 with the equalized error signal from equalizer 108 and connects its sum output, through the switch 106 as the scanner signal, $V_s(t)_y$, on line 77 for a scanner in FIG. 26.

Due to the use of a microprocessor 113 in the groove tracking servo loop, special additional processing of the tracking data can be incorporated to reduce susceptibility to groove anomalies. For example, by restricting unusual lateral (Y-axis) acceleration components, anti-scratch immunity can be provided. Optimal groove tracking can be provided by using the previous tracking history which can be stored in processor 113. Programmability and song cueing is easily accomplished by searching for the wide land region 37 between songs.

Figure 26:
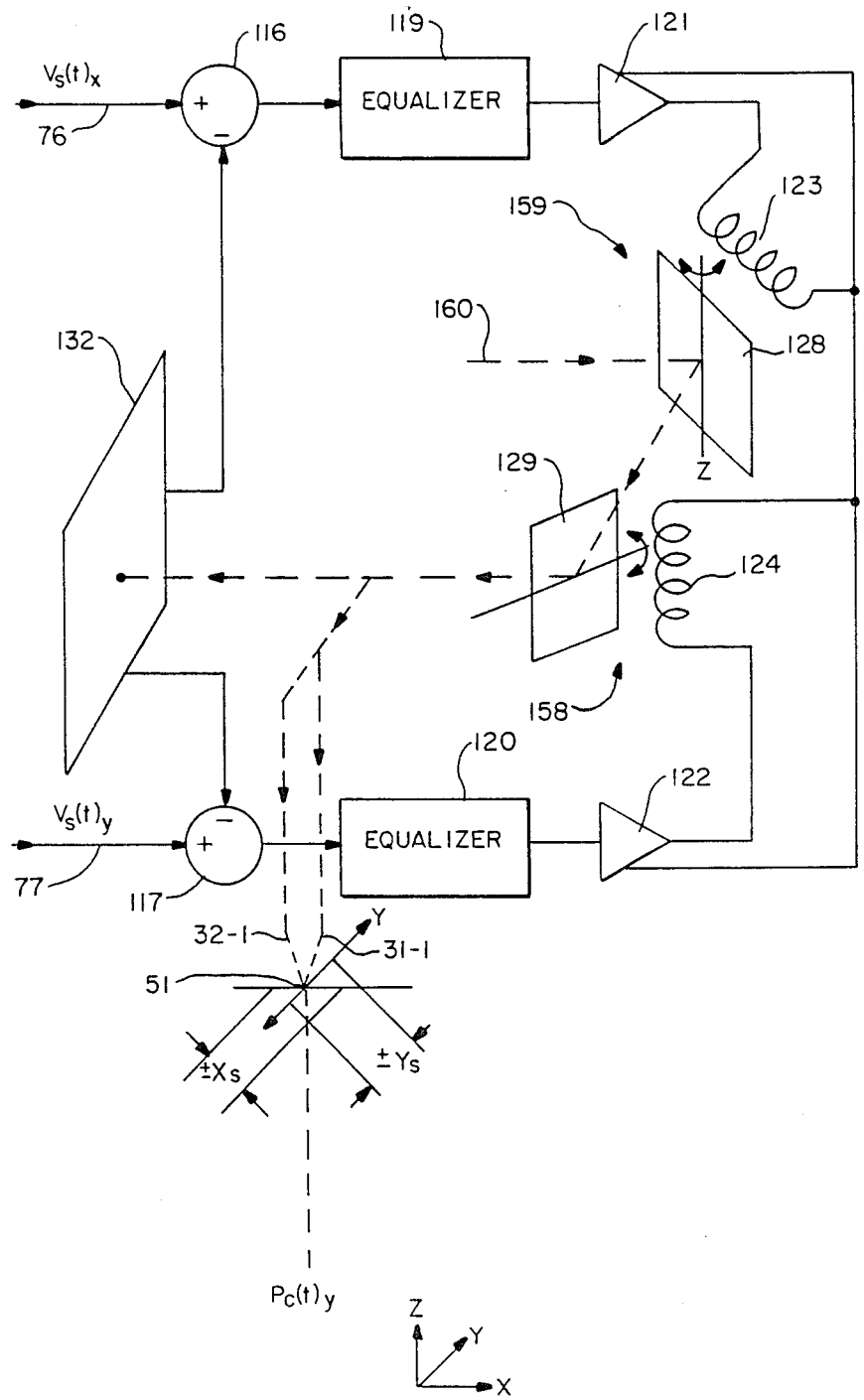
FIG. 26 depicts an electrical and optical schematic of the tangential and lateral optical scanners which form part of the lateral and tangential feedback loops within the data and tracking assembly of FIG. 24.

The electronics of FIGS. 25 and 26 are capable of operating in several different modes. In a first mode, switch 106 is open so that a single Y-axis servo loop exists. The single Y-axis servo loop, called the carriage servo loop, consists of the subtractor 91 and adder 92, the divider 99, the frequency equalizer 108, the filter 109, the A/D converter 110, the digital processor 113, the motor drive 160 in FIG. 25 and the motor 78, the sliding carriage 86 together with the optical assemblies 79 and 80 of FIG. 24.

The servo system in the first mode (switch 106 open) can easily follow a groove over its approximately 4 inches (100 mm) of lateral Y-axis travel. The audio quality produced, however, is dependent upon the degree of lateral groove modulation relative to the closed loop tracking bandwidth of the carriage servo and upon the sensing geometry. A highly modulated groove for example, may be 3 mils ($3 \times 10^{-3}$ inch) wide and travel 10 mils ($10^{-2}$ inch) peak to peak at a 400 Hz rate. Such groove modulation can be tracked with as little as 20 Hz bandwidth although the audio quality will suffer due to land groove truncation of the reflected rays during times of high lateral modulation. To avoid distortion, a high servo bandwidth consistent with the modulation tracking requirements must be provided. In the first mode, the high bandwidth lateral tracking servo provides hi-fidelity audio reproduction by carefully designing the electro-mechanical carriage servo loop. This task becomes more difficult as the mass of the carriage 86 (including optical assemblies 79 and 80) increases due to power requirements and mechanical resonances. In one example of the first mode, frequency equalizer 108 has a constant gain over all frequencies of interest and low pass filter 109 has a 100 Hz cutoff frequency.

In order to simplify the design requirements of the carriage servo from what is required in the first mode, a second mode is provided. In the second mode, switch 106 is closed and a small low-inertia moving-mirror galvanometer scanner 158 in FIG. 26, mounted in the optical assembly 79 of FIG. 24, is employed. The Y-axis scanner 158 has a limited range which causes a small lateral translation, $\pm Y_s$ in FIG. 26, of the incident rays 31-1 and 32-1 about point 51 in response to a current applied to the coil 124. A scanner servo loop is provided as shown in FIG. 26 including scanner 158, sensor 132, difference circuit 117, equalizer 120 and amplifier 122. Embedding the scanner 158 in the servo loop allows more control over the scanner, but satisfactory operation can be achieved at lower cost using the scanner alone.

This second mode arrangement of a lateral Y-axis scanner has several practical advantages over the sole use of the carriage servo of the first mode particularly, the groove tracking accuracy is no longer dependent on the carriage servo mechanical properties, but is determined by the scanner servo dynamics, which can easily have a bandwidth of several kilohertz (even up to 20 KHz). In this second mode, the carriage servo loop of the first mode becomes a servo following loop which attempts to hold $V_s(t)_y$ equal to 0 and in so doing, keeps the scanner mirror 129 in scanner 158 centered such that the incident rays remain in a middle position at point 51 between $+Y_s$ and $-Y_s$.

In the second mode, groove tracking accuracy is determined by the total lateral servo characteristics and in particular the frequency equalizer 108 and the scanner alone or when employed the scanner servo characteristics. The equalizer 108 in the second mode is designed to frequency compensate either the scanner alone or the scanner servo dynamic properties for best tracking performance. In either of the second modes, the open loop transfer function from $V_{err}(t)_y$ to $P_c(t)_y$ has the property of high gain at low frequencies and low gain above the desired closed loop bandwidth. The existence of a high gain causes $V_{err}(t)_y$ to remain small in response to groove motion.

The carriage 86 in the second mode can be large and heavy to serve as a stable base for the scanner, sensors, and other components. The scanner also makes the carriage servo easy to design by eliminating any dependency on sensor gain variations. This result is possible because the scanner output position, $P_s(t)_y$, is directly determined by the scanner input, $V_s(t)_y$, over the range of frequencies that the carriage 86 must respond.

In a third mode of operation, an indirect measurement of the groove velocity using the filtered signal, $V_g(t)_y$, is employed by having both switches 105 and 106 closed. The $V_g(t)_y$ signal is derived from the sensors and equals the sum of the left and right wall normalized $Y_{\pm 45z}$ groove velocities and therefore equals the lateral Y-axis groove velocity. The signal $V_g(t)_y$ is integrated in filter 104 and AC-coupled to eliminate DC errors, to form a signal on line 172 which represents a lateral position trajectory. The lateral position trajectory signal is used to significantly reduce the AC component of the groove error when the scanner servo is designed such that the change in scanner position $P_s(t)_y$ is proportional to the change in $V_s(t)_y$ over the desired range of frequencies and travel. When the scanner servo has this property, the application of $V_s(t)_y$ forces the mirror 129 to precisely follow the groove AC component. This operation has a large impact on the overall lateral servo performance because now the lateral carriage servo only need track the difference between position established by the groove trajectory signal, $V_s(t)_y$, and the actual groove position, $P_g(t)_y$. This operation is desirable because now the carriage servo bandwidth can be reduced for the same tracking performance thereby minimizing sensitivity to noise disturbances exhibited by the error signal, $V_{err}(t)_y$. Such noise disturbances may arise due to damage to the land-groove interface on records. These same noise disturbances do not affect $V_s(t)_y$ which is amplitude insensitive.

The position, $P_c(t)_y$, of the incident light rays (axis 57 in FIGS. 18, 20, 22, and 26) is determined by scanner position component, $P_s(t)_y$, (determined by scanner 158 and mirror 159 of FIG. 26) and by the carriage position component, $P_{car}(t)_y$, (determined by carriage 86 in FIG. 24) as follows:

Eq. (17) $P_c(t)_y = P_s(t)_y + P_{car}(t)_y$.

The positional error, $P_{err}(t)_y$, is the difference between the incident light ray position, $P_c(t)_y$, and the groove position, $P_g(t)_y$, as follows:

Eq. (18) $P_{err}(t)_y = P_g(t)_y - P_c(t)_y$.

Using Eq. (17), in Eq. (18) yields,

Eq. (19) $P_{err}(t)_y = P_g(t)_y - [P_s(t)_y + P_{car}(t)_y]$

From Eq. (19), the scanner tracks (with higher bandwidth) the groove position, $P_g(t)_y$, so that the carriage position, $P_{car}(t)_y$, need only track the difference $[P_g(t)_y - P_s(t)_y]$. The difference $[P_g(t)_y - P_s(t)_y]$ changes much more slowly (lower bandwidth) than does $P_g(t)_y$ when operated in accordance with the third mode. By way of contrast, in the first mode with no scanner operation, $P_{car}(t)_y$ must track changes in the groove position, $P_g(t)_y$, directly since $P_s(t)_y$ is a constant. In FIG. 25, the $V_{err}(t)_y$ signal is proportional to $P_{err}(t)_y$.

In the preferred embodiment described, the lateral tracking signals were derived from the left and right wall detectors using a truncation of the reflected beams. However, other tracking methods, without requiring truncation of the reflected beams, can be employed in the optical turntable system. For example, tracking can be carried out by conventional mechanical stylus with the data extraction carried out in the manner previously described. While such a stylus implementation for tracking tends to cause record wear, that wear is generally outside the incident spot and does not affect the data detection.

Vertical Tracking (FIGS. 27-30).

In FIG. 27, an XZ plane view of the assembly 9 of FIG. 24 is shown. The second optical assembly 80 is movable in the Z-axis direction relative to the first optical assembly 79. Optical assembly 80 is connected to the voice coil shafts 85-1 and 85-2. The shafts 85-1 and 85-2 are formed as non-magnetic cores that have electrical windings 168-1 and 168-2, respectively, driven by the amplifier 68. The shafts 85-1 and 85-2 are positioned within permanent magnets 84-1 and 84-2 which are rigidly attached to the carriage 86 and the optical assembly 79. The optical rays 36 from the optical assembly 79 are reflected by the mirror 141 so that the rays 33-1 are incident in the region of interest 15 on record 10. The reflected rays 33-2 are incident on the sensor 12-2. The sensor 12-2 provides an output on lines 145 which connect to the equalizer 69. The output from the equalizer 69 connects the line 66 to the amplifier 68.

The height $H(t)_z$ of the movable optical assembly 80 above the record 10 is controlled by the height servo loop consisting of the sensor 12-2, the equalizer 69, the amplifier 68, the voice coils 67-1 and 67-2, the first optical assembly 79 and the second optical assembly 80. The function of the height servo loop is to maintain the height of the second optical system 80 at a constant value, approximately 2 mm in one example, above the surface 14 of record 10.

Figure 28:
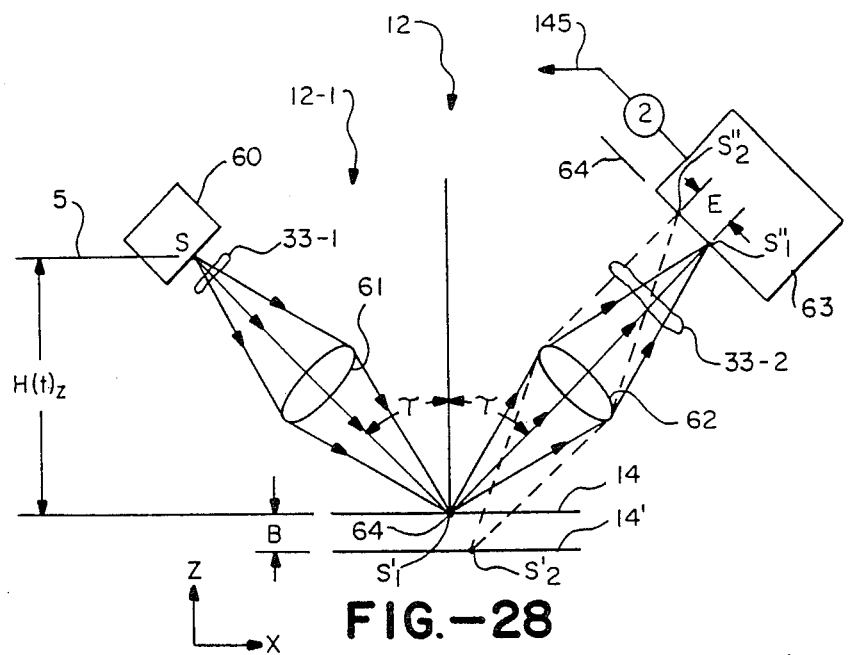
FIG. 28 depicts an optical schematic representation of the height detector which forms part of the data and tracking assembly of FIG. 27.

Referring to FIG. 28, the height, $H(t)_z$, of the record surface 14 in the vicinity of the sensing region 15 from the plane 5 (parallel to the XY-plane) of the tracking assembly 9 is sensed by projecting a small spot, S, of light obliquely onto the surface 14 of a record 10 in a region greater in size than a single groove section and in the vicinity of the groove section of interest. The groove section of interest includes at least the regions where the spots 50 and 50', as described in connection with FIGS. 18 through 23, are located.

Figure 29:
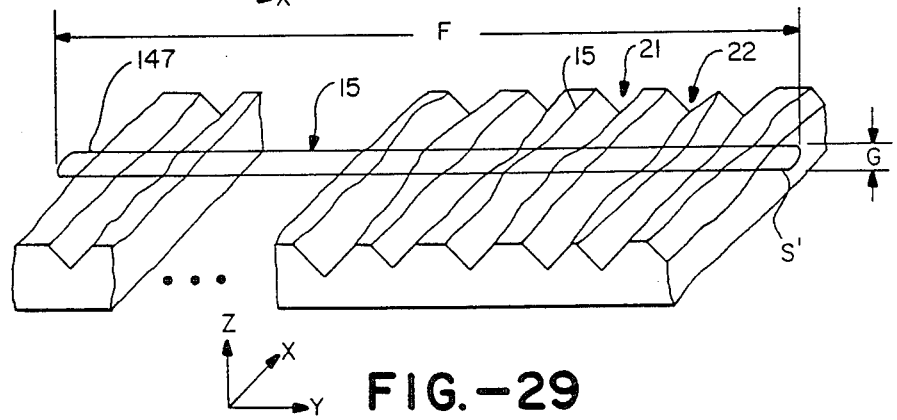
FIG. 29 depicts a isometric view of the incident light spot on the surface of a record as utilized in the height detector of FIG. 28.

In FIG. 28, the height detector 12 is schematically shown and includes a light source 12-1 and a light sensor 12-2. The source 12-1 includes a light 60, such as a laser, which is focused through a cylinder lens 61 to form a spot $S_1'$ on the surface 14 of record 10. As indicated in FIG. 29, the spot S' has a dimension, F, in the Y-axis direction, which extends across the width of many groove sections including the sections 21 and 22. The dimension, G, of the spot S' in the X-axis direction is typically 30 to 100 times smaller than the Y-axis dimension F so that changes in height in the direction of the data signal, the X-axis direction, are responsively detected. The spot S' is in the form of a narrow stripe which has its width G much narrower than the wavelength, $\lambda$, of the groove wall signal so that the height signal, $H(t)_z$, is not corrupted by groove wall modulation.

The object S at the light source 60 forms the image $S'_1$ on the surface 14. The position of the light spot $S'_1$ is detected by sensor 12-2 which includes the lens 62 and the spot position sensor 63. The light spot $S'_1$ is imaged in the optical reflection path onto a small position sensing detector 63 at the location $S''_1$. The purpose of the lens 62 is to reduce the detector 63 sensitivity to angular contours of the surface 14 within the sensing region 15 and in the Y-axis direction, by imaging the record onto the sensor 63. Because of the specular property of the record surface, as the surface position moves, the reflected image position varies accordingly as is explained by Tanwar, L. S. and Kunzman, H.; "An Electro-Optical Sensor for Microdisplacement Measurement and Control"; *Journal of Physics E*, Vol. 17, 1984.

Let the mean angle of the incident light beam 33-1 from source 60 in the XZ-plane be $\tau$. The image shift E at the sensor plane 64 of sensor 63 due to a normal displacement, B, in the Z-axis direction of the record surface 14 in the sensing region 15 is given as follows:

(Eq. 20) $E = m^*2B \sin \tau$ where:
m = magnification of the reflection path imaging lens 62.

The light spot $S'_2$ is imaged in the optical reflection path onto a small position sensing detector 63 at the image location $S''_2$. The difference in position between $S''_1$ and $S''_2$ on the image plane 64 of detector 63 is the image shift E. Detector 63 is a position sensing device, such as a PSD chip, which provides an electrical signal on lines 145 proportional to E. The signal on lines 145 from the height sensor 63 of FIG. 28 is used to close a height servo loop which controls the vertical positioning motor as indicated in FIG. 27.

Figure 30:
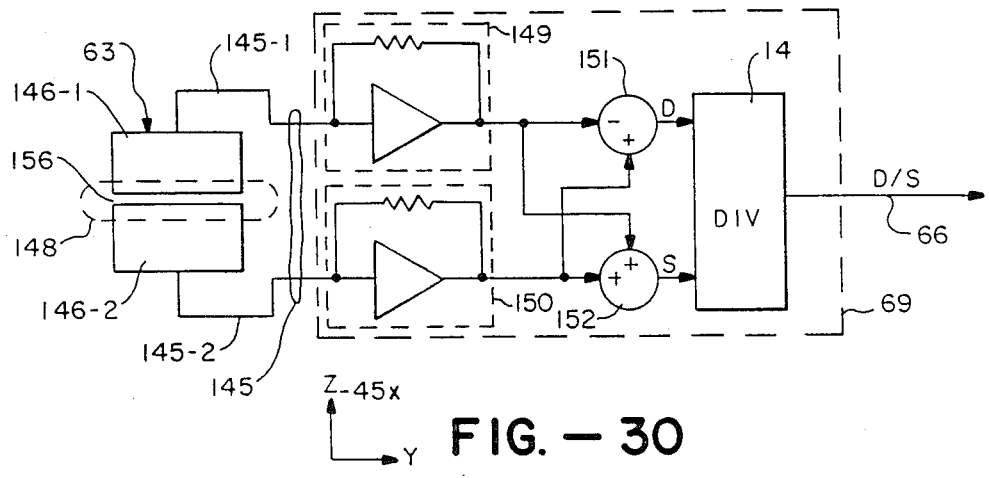
FIG. 30 depicts an electrical and optical schematic of the electronic circuit utilized in the height detector of FIGS. 27 and 28.
Figure 31:
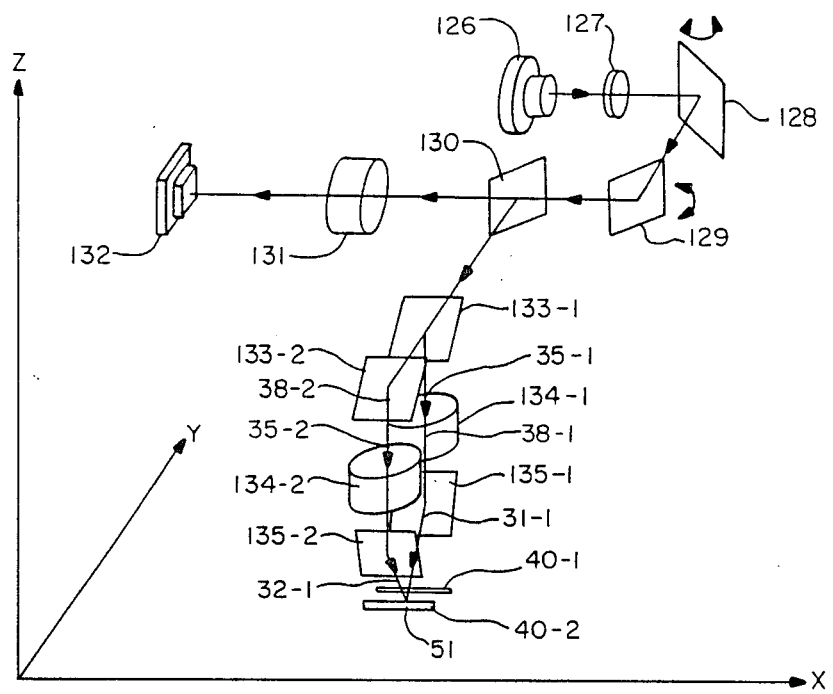
FIG. 31 depicts an XYZ isometric optical schematic view of the lateral tracking, tangential tracking and data units.
Figure 32:
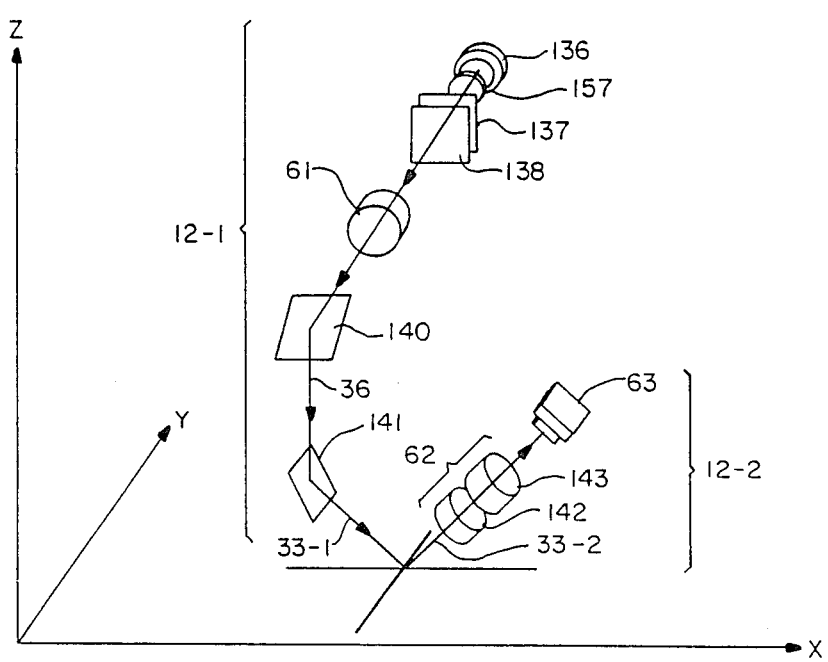
FIG. 32 depicts an XYZ isometric optical schematic view of the optical height unit.
Figure 33:
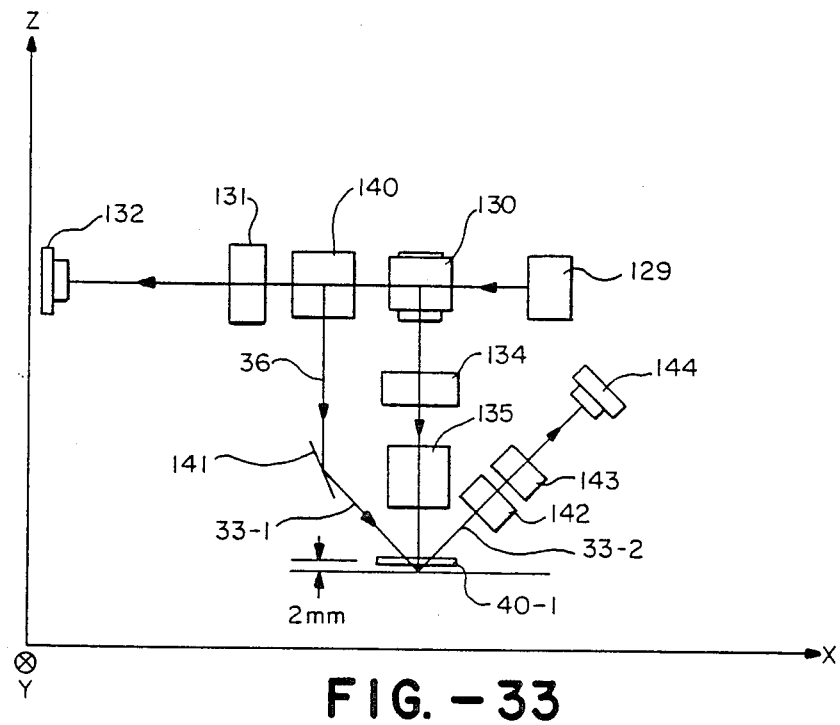
FIG. 33 depicts an XZ-plane optical schematic view of all of the optical units of the present invention.
Figure 34:
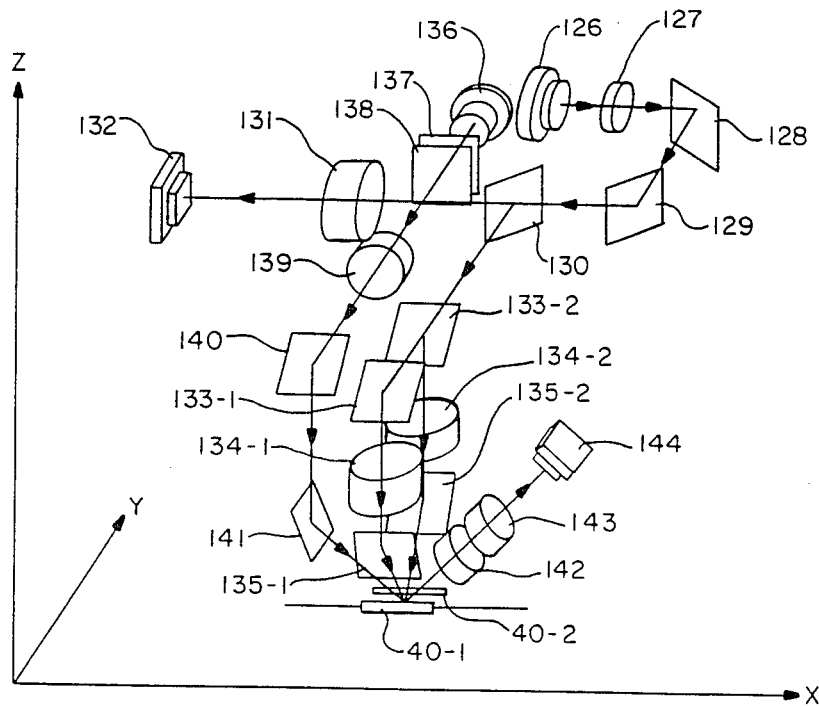
FIG. 34 depicts an XYZ isometric optical schematic view of all of the optical units of the present invention.

In FIG. 30, further details of the sensor 63 and equalizer 69 for the height positioning unit of FIG. 27 are shown. The reflected rays 33-2 are incident with a spot 148 (spot $S''_1$ of FIG. 28) on the split cell sensor 63. Sensor 63 includes a first cell 146-1 separated by a small gap 156 ($10^{-5}$ inch) from a second cell 146-2. The incident spot 148 straddles the gap 156 between the cell 146-1 and the cell 146-2. The output on line 145-1 from the cell 146-1 is proportional to the amount of the spot 148 which is incident upon the cell 146-1. Similarly, the output on line 145-2 is proportional to the amount of the spot incident on the cell 146-2. Movement of the spot 148 in the positive $Z_{-45x}$ direction in FIG. 30 is the equivalent of moving the spot $S''_1$ to the spot $S''_2$ in FIG. 28.

The outputs from the cells 146-1 and 146-2 on lines 145-1 and 145-2 connect as inputs to the current-to-voltage amplifiers 149 and 150. The output from amplifier 149 connects as the negative input to the difference circuit 151 and the positive input of the sum circuit 152. The output from the amplifier 150 connects as the positive input to the difference circuit 151 and as a positive input to the sum circuit 152. The difference signal output from the difference circuit 151 connects as an input to the analog divider 148. Similarly, the output from the sum circuit 152 connects as an input to the analog divider 148. The analog divider 148 divides the difference signal by the sum signal to provide the height error signal, $V_{err}(t)_z$, on line 66.

The height error signal on line 66 tends to be a null value whenever the spot 148 is equally positioned over both cells 146-1 and 146-2. Whenever spot 148 tends to be positioned over more of one of the cells 146-1 or 146-2, an error signal appears on line 66 which is proportionately offset from the null value. This error signal, in the FIG. 27 height servo loop, tends to drive the voice coils 67-1 and 67-2 in a direction which corrects the position of the spot 148 such that it is equally incident on each of the cells 146-1 and 146-2.

Based upon the height dynamics, the closed loop servo system of FIG. 26 was designed and built to maintain better than 3 micrometer height accuracy over the section of the groove of interest. This servo has a loop bandwidth of 40–50 Hz and a peak-to-peak height displacement, $H(t)_z$, of approximately 5 mm. To achieve this bandwidth, the equalizer 69 in FIG. 27 is a low pass filter with a cutoff frequency of 50 Hz.

Sources of Tracking Errors.

Since the vinyl record is a medium with difficult physical properties, there are several error sources which need to be evaluated for proper tracking. Included are such factors as record eccentricity, record ellipticity and land dropouts.

Record Eccentricity. The major source of record wow and flutter (speed variations) is the incorrect position (and/or) size of the record hole. It is not uncommon to find a 0.5 to 1 mm offset error which generates a 1% or so tangential error from the resulting speed inaccuracy. This tangential error manifests as tonal variation of the music if not compensated.

In addition, the effect of this eccentricity is a requirement to bidirectionally track the lateral position slide. Rather than a unidirectional radial tracking requirement for a perfect spiral, the eccentricity requires reversals in direction for bidirectional tracking.

Record Ellipticity. Unfortunately the advances of unidirectional tracking can still not be applied because of a second bidirectional tracking requirement. Due to the nonuniform cooling of the pressing operation and to the long term flow of the vinyl, there exists a general ovality of records which manifests as a fundamentally twice-around requirement for tracking reversal.

A typical ellipticity measurement of a record is only 50 to 200 microns; however, this value is sufficient to necessitate bidirectional movement.

Land Dropouts. Within songs on many records, the land between songs appears to dropout [see FIG. 9(A)]. This dropout is typically due to major lateral modulation excursions and is therefore transient. Such land dropouts have no effect on the preferred tracking methods of the embodiments described.

Tangential Tracking (FIGS. 25–26)

The tangential unit 34 of FIG. 1 includes a portion of the electronics unit 72 of FIG. 25 and includes the difference circuit 116, equalizer 119, amplifier 121, and scanner 159 of FIG. 26. The purpose of the tangential (X-axis) unit 34 is to cause the tracking assembly 9 to track any tangential movement of the record groove thereby reducing wow and flutter. When the tracking assembly 9 is tracking without tangential error, the tangential groove velocity, $V_T(t)$, at the sensing point 51 follows the relationship $V_T(t) = 2\pi R_{yt}(t)/T$ where T is the revolution time of the record and where the origin of $R_{yt}(t)$ is the true center of the spiral groove 20. If the actual groove center radius, $R_y(t)$, is allowed to vary during playback due to the record (or record hole) being off-centered thereby resulting in wow (once per revolution error), or due to record ellipticity resulting in flutter (twice per revolution error), then the audio signal will be frequency modulated resulting in low frequency audio modulation, that is, resulting in wow and flutter.

The unwanted low frequency change in frequency, $df_s$, is given by the following Eq. (21):

$$df_s = (2\pi) [dR_{yt}(t)]/(T\lambda) \qquad \text{(Eq. 21)}$$

where, $\lambda$ = spatial wavelength of the signal on the record.
$= V_T(t)/fs$ The record drive assembly 11 insures that T is held constant thereby eliminating T-caused unwanted $V_T(t)$ variations. The tangential unit 34 prevents low frequency errors in the audio output signal due to $df_s$ from occurring by simply servoing the groove angle detection point in the tangential (X-axis) direction in order to hold the actual radius $R_y(t)$ equal to the error-free center radius $R_{yt}(t)$. This servoing is accomplished with a tangential servo unit including tracking scanner 159 in FIG. 26 having characteristics similar to the lateral scanner 158. The tangential scanner 159 is placed in the light path to receive rays 160 before (or after) the scanner 158 and oriented as shown in FIG. 26. This tangential (X-axis) servo is operated open loop in that its command signal, $V_s(t)_x$, is derived from the low frequency carriage 86 motion. The low frequency motion of the record corresponds to once-around and twice-around frequency components that are extracted by processor 113. The processor 113 output is connected through the D/A converter 112 to form the tangential signal, $V_s(t)_x$, which drives the tangential scanner. The tangential servo loop includes the difference circuit 116, the frequency equalizer 119, the amplifier 121 and the low-inertia moving-mirror galvanometer 159 (driven by coil 128).

Optical Assemblies (FIGS. 31–41)

In FIGS. 31 through 34, further details of the optical assemblies 79 and 80 of FIGS. 24 and 27 are sown. The individual optical elements for the left and right wall detectors are identified in TABLE 1.

TABLE 1

| | Z-axis Fixed (Assembly 79) |
|---|---|
| 126 | LASER DIODE |
| 127 | COLLIMATING LENS |
| 128 | DIELECTRIC MIRROR |
| 129 | DIELECTRIC MIRROR |

TABLE 1-continued

| | |
|---|---|
| 130 | PLATE BEAM SPLITTER |
| 131 | PLANO CONVEX SPHERICAL LENS |
| 132 | QUAD CELL |
| 133-1 | PLATE BEAM SPLITTER |
| 133-2 | DIELECTRIC MIRROR |
| | Z-axis Moving (Assembly 80) |
| 134-1 | SPHERICAL ACHROMATIC LENS |
| 134-2 | SPHERICAL ACHROMATIC LENS |
| 135-1 | DIELECTRIC MIRROR |
| 135-2 | DIELECTRIC MIRROR |
| 40-1 | LINEAR PSD |
| 40-2 | LINEAR PSD |

The individual optical elements for the height detector are identified in TABLE 2.

TABLE 2

| | |
|---|---|
| | Z-axis Fixed (Assembly 79) |
| 136 | HEIGHT TRACKING LASER DIODE |
| 157 | COLLIMATING LENS |
| 137 | NEUTRAL DENSITY FILTER |
| 138 | HALF WAVE PLATE |
| 61 | PLANO CONVEX CYLINDER LENS |
| 140 | PLATE BEAM SPLITTER |
| | Z-axis Moving (Assembly 80) |
| 141 | DIELECTRIC MIRROR |
| 142 | SPHERICAL ACHROMATIC LENS |
| 143 | SPHERICAL ACHROMATIC LENS |
| 63 | BICELL PSD |

System Performance and Advantages

The optical system of the present invention has significant performance advantages compared to mechanical stylus systems. These advantages derive in part from the non-contact nature of an optical system.

No Wear. Data extraction via laser requires no contact between the optical detectors and the record, resulting in a no-wear system turntable. A no-wear turntable system permits unlimited playing of conventional records without deterioration in sound unlike conventional turntables.

Resurrection of Worn Records. The optical data extraction method senses from a different part of the record groove than does a mechanical stylus. Therefore, the area of the groove "pitted" by the stylus will be ignored or minimized (see FIG. 17). Essentially, this allows pitted or worn records to be "resurrected".

No Stylus Replacement. The laser is expected to last well over 10,000 hours of use.

Improved Sound Quality. The optical turntable system provides a 10 time reduction in total harmonic distortion relative to the best mechanical systems. Many independent factors contribute to this reduction.

One factor is the overall Signal-to-Noise Ratio(SNR). The optical turntable system consistently measures better than 76 dB SNR. This SNR is typically 15 to 20 dB better then the record material and 30 to 40 dB better than mechanical styli. Another factor is frequency response. The optical turntable system frequency response is flat 20 Hz to 16 KHz (−4 dB at 20 KHz) with no dips or peaks in between. A stylus, however, is a mechanical beam which becomes lossy above 1 KHZ and has several resonances out to 20 KHz.

If the record were indefinitely rigid and the effective stylus-tip impedance zero, then the stylus motion at each groove wall for a 1 KHz square wave would be projected as a series of V-shaped segments topped by an arc with a radius equal to the radius, $R_s$, of the stylus. The normal acceleration, A, of the arc-shaped portion is described by:

$$A = V_g^2/R_s \qquad \text{(Eq. 22)}$$

where:
$V_g$ = linear groove velocity (cm/sec)
$R_s$ = radius of stylus tip(cm)

For typical $V_g$ and $R_s$ values of 50 cm/sec and 0.00178 cm, acceleration on the order of $1.4 \times 10^6$ cm/sec$^2$ (equivalent to 1400 G units) would occur according to CBS Laboratories, Square Wave Tracking and Intermodulation Test Record, STR 112, (Back cover) and White, James V., "Mechanical Playback Losses and the Design of Wideband Phonographic Pickups", AES Convention Proceedings, Oct 7, 1971, Published in AES Anthology #1, p. 233.

Acceleration at the bottom of the V-shaped section of a groove would be infinite. In practice, a mechanical stylus actually deforms the elastic groove wall (over 22,000 PSI) and follows an acceleration profile which depends upon distorting the groove wall.

The abrupt changes in slope tend to cause oscillations of the playback system resulting, for example, from the stylus assembly groove compliance. Since the optical beam in the optical turntable system has no inertia, a practically perfect wave reproduction can be realized.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An optical turntable system for playing a phonograph record having a recorded signal in a groove where the groove is formed by at least a first wall having a position modulated by the recorded signal comprising,
   an optical unit including an optical source and an optical sensor, said source providing a light beam incident to form an incident spot on said wall and a reflected beam from said wall forming a non-interfered reflected spot, at said optical sensor, with a spot position proportional to the recorded signal, said optical sensor for sensing the spot position of said reflected spot to provide an output signal proportional to the recorded signal,
   a drive assembly for moving the record relative to said optical unit.

2. The system of claim 1 wherein said groove is formed by said first wall and by a second wall where said first wall and said second wall intersect at an angle of approximately 90 degrees, each of said walls at an angle of approximately 45 degrees with respect to a plane formed by the surface of said record, and wherein said optical source provides said light beam incident onto said first wall at an angle in the range of 10 to 24 degrees with respect to an axis normal to the plane of said first wall at the point of incidence of said first beam on said first wall.

3. The system of claim 1 wherein said groove is formed by said first wall and by a second wall where said first wall and said second wall intersect at an angle, each of said walls extending at an angle with respect to a plane formed by the surface of said record, and wherein said optical source provides said light beam incident onto said first wall at an incident angle with respect to an axis normal to the plane of said first wall at the point of incidence of said first beam whereby the reflected angle for said reflected beam is proportional to said incident angle and said recorded signal.

4. The system of claim 3 wherein said optical unit includes a vertical unit for positioning said optical unit a predetermined height from said record.

5. The system of claim 3 wherein said optical unit includes a tracking assembly for causing said light beam to be tracked with said groove as the record rotates said groove, said first wall, and said second wall each having a position including a lateral position and a tangential position.

6. The system of claim 5 wherein said tracking assembly includes a lateral unit having lateral detector means for detecting the lateral position of said groove, said lateral detector means providing one or more incident light beams incident with a lateral displacement relative to said groove, and for providing a lateral error signal as a function of the lateral displacement of said one or more light beams relative to said grove and having lateral servo means responsive to said lateral error signal for tracking said light beam in said groove.

7. The system of claim 6 wherein said lateral detector means includes a first detector providing a first incident light beam as one of said one or more incident light beams incident with a first lateral position relative to said first wall for providing a first detector signal for indicating the lateral position of said first wall and includes second detector providing a second incident light beams as one of said one or more incident light beams incident with a second lateral position relative to said second wall for providing a second detector signal indicating the lateral position of said second wall, said lateral detector means including electronic means for processing said first detector signal and said second detector signal to provide said lateral error signal.

8. The system of claim 7 wherein said first detector includes a first source for providing said first incident light beam onto said first wall whereby a first reflected beam is reflected from said first wall, and including a first sensor for sensing said first reflected beam, said sensor providing said first detector signal, and wherein said second detector includes a second source for providing said second incident light beam onto said second wall whereby a second reflected beam is reflected from said second wall, and including a second sensor for sensing said second reflected beam, said second sensor providing said second detector signal.

9. The system of claim 8 wherein said first source and said first sensor are positioned relative to said first wall such that one component of said first reflected beam is blocked by said second wall and such that a first component of said first reflected beam is not blocked by said second wall whereby said first detector signal is proportional to said first component of said first reflected beam, and wherein said second source and said second sensor are positioned relative to said second wall such that one component of said second reflected beam is blocked by said first wall and such that a second component of said second reflected beam is not blocked by said first wall whereby said second detector signal is proportional to said second component of said second reflected beam.

10. The system of claim 9 wherein said tracking assembly includes electronic means for processing said first and second detector signals to form said lateral error signal, said electronic means including difference means for subtracting said first detector signal from said second detector signal to form a difference signal thereby forming said lateral error signal.

11. The system of claim 9 wherein said electronic means includes filter means for filtering said lateral error signal, and means for providing a lateral drive signal and wherein said lateral servo means includes a motor, responsive to said lateral drive signal, for driving said lateral detector means in a direction which tends to reduce said lateral error signal.

12. The system of claim 6 wherein said lateral servo means includes equalizer means for filtering said lateral error signal, said equalizer means having a high gain at lower frequencies within the pass band of said lateral servo means and a low gain for frequencies above said pass band, said frequency equalizer providing a frequency equalized signal, and includes a first servo loop and a second servo loop each receiving said frequency equalized error signal, said first servo loop including high bandwidth scanner means for causing the incident light beam to track the lateral position of said groove, said second servo loop including a carriage for translating said optical unit in the lateral direction, including motor means for driving said carriage in the lateral direction, and including a low frequency filter for filtering said frequency equalized error signal to form a filtered error signal as a motor drive signal for driving said motor means whereby said carriage tracks said groove with a low frequency response.

13. The system of claim 12 wherein said scanner means includes a scanner servo loop, said scanner servo loop including a scanner having a scanner position for scanning said incident beam in said lateral direction, a scanner sensor for sensing the scanner position and for providing a scanner signal, difference means for subtracting said scanner signal from said equalized error signal to provide a scanner difference signal, equalizer means for filtering said scanner difference signal to provide a scanner drive signal for driving said scanner to cause said incident beam to track said groove position with a high frequency response.

14. The system of claim 13 wherein said scanner is a low-inertia moving-mirror galvanometer.

15. The system of claim 13 wherein said electronic means includes means for forming a velocity signal from said first and second detector signals, feed forward filter means for integrating said velocity signal to form a trajectory signal, means for summing said trajectory signal and said equalized error signal for providing said scanner signal.

16. The system of claim 12 wherein said second servo loop includes a digital processor, an analog-to-digital converter for converting said filtered error signal to a digital filtered error signal, and wherein said digital processor provides said digital error signal as the motor drive signal to said motor means.

17. The system of claim 5 wherein said tracking assembly includes a tangential unit having tangential detector means for detecting the tangential position of said groove, said tangential detector means providing a tangential position for said optical unit and providing a tangential signal as a function of the difference between the tangential position of said groove for revolutions of said record relative to the tangential position of said optical unit, and including tangential scanner means driven by said tangential signal for tracking said groove whereby wow and flutter in said output signal are reduced.

18. The system of claim 17 wherein said tangential scanner means includes a low-inertia moving-mirror galvanometer driven in response to said tangential signal.

19. The system of claim 17 wherein said tangential scanner means includes a tangential servo comprising a tangential scanner for positioning said incident beam tangential position for said optical unit, a tangential sensor for sensing said tangential position of said incident beam to provide a tangential sensor signal, difference means for subtracting said tangential sensor signal from said tangential signal to provide tangential difference signal, equalizer means for filtering said tangential difference signal to provide said tangential signal for driving said tangential scanner to cause said incident beam to track the tangential position of said groove whereby wow and flutter are reduced.

20. The system of claim 5 wherein said tracking assembly includes a tangential unit having tangential detector means for detecting the tangential position of said groove and for providing a tangential error signal as a function of the tangential position of the light beam relative to said groove and having tangential servo means responsive to said tangential error signal for tracking said light beam in said groove.

21. The system of claim 5 wherein said tracking assembly includes detector means for detecting the position of said groove, said detector means providing one or more incident light beams at a displacement relative to the position of said groove and providing an error signal as a function of the displacement of the light beam relative to the position of said groove and having servo means responsive to said error signal for tracking said light beam in said groove.

22. The system of claim 21 wherein said detector means includes a first detector means for providing a first detector signal for indicating the position of said first wall and includes second detector means providing a second incident light beam as one of said one or more incident light beams for providing a second detector signal indicating the position of said second wall, said detector means including electronic means for processing said first detector signal and said second detector signal to provide said error signal.

23. The system of claim 5 wherein said record has a surface said tracking assembly includes a vertical unit for positioning said optical unit a predetermined height from the surface of said record wherein the optical unit has a vertical displacement from the predetermined height.

24. The system of claim 23 wherein said vertical unit includes a vertical detector for detecting said predetermined height and for providing a vertical error signal as a function of the vertical displacement of the optical unit from said predetermined height and includes vertical servo means responsive to said vertical error signal for tracking said optical unit at said predetermined height.

25. The system of claim 24 wherein said vertical detector includes a vertical source for providing an incident vertical detector beam incident upon the record surface to provide a reflected vertical detector beam and includes a vertical sensor position to sense said vertical detector reflected beam.

26. The system of claim 25 wherein said record includes groove sections extending in a lateral direction and in a tangential direction the spot size of said vertical detector incident beam has a first dimension which extends across many groove sections in the lateral direction and has a second dimension extending in the tangential direction which is much smaller than the first dimension.

27. The system of claim 26 wherein said vertical sensor is a bicell.

28. The system of claim 24 wherein said vertical servo has a bandwidth of approximately 0 to 50 Hz.

29. The system of claim 6 wherein said lateral unit further includes a first optical assembly moved laterally by said lateral servo means and includes a second optical assembly movably engaged in the vertical direction with said first optical assembly.

30. The system of claim 29 wherein said second optical assembly is vertically and movably engaged with said first optical assembly by one or more solenoids.

31. The system of claim 3 wherein said optical unit includes a first detector means for providing first detector signals for indicating the modulation of said first wall and includes second detector means for providing second detector signals for indicating the modulation of said second wall, and includes electronic means for processing said first detector signals and said second detector signals to provide first and second data signals.

32. The system of claim 31 wherein said electronic means includes,
first sum means for summing said first detector signals to form a first sum signal, includes first difference means for subtracting said first detector signals to form a first difference signal, includes division means for dividing said first difference signal by said first sum signal to normalize said first detector signals and thereby form said first data signal,
second sum means for summing said second detector signals to form a second sum signal, includes second difference means for subtracting said second detector signals to form a second difference signal, includes division means for dividing said second difference signal by said second sum signal to normalize said second detector signals and thereby form said second data signal.

33. The system of claim 32 wherein said electronics means includes means for generating a lateral position signal and first multiplier means for multiplying said first data signal by said position signal to form a first normalized data signal and second multiplier means for multiplying said second data signal by said position signal to form a second normalized data signal, includes first means for RIAA equalizing said first normalized data signal to form a first equalized data signal and second RIAA equalizer means for equalizing said second normalized data signal to form a second equalized data signal.

34. The system of claim 31 said groove is in the form of a spiral around a center of said record and exhibiting groove sections in a lateral direction away from said center and having a tangential direction generally orthogonal to said lateral direction wherein said first detector means is oriented in the tangential direction for providing first detector signals for indicating the lateral modulation of said first wall and includes second detector means oriented in the tangential direction for providing second detector signals for indicating the lateral modulation of said second wall.

35. The system of claim 31 wherein,
said first detector means includes a first light source for providing a first light beam to make a first incident spot on said first wall with a dimension which ranges from 3 to 12 micrometers,
said second detector means includes a second light source for providing a second light beam to make a second incident spot on said second wall with a dimension which ranges from 3 to 12 micrometers.

36. The system of claim 36 wherein said first and second spots have said dimensions approximately 6 micrometers.

37. The system of claim 1 wherein said optical source provides said first light beam so as to make said incident spot have a dimension which ranges from 3 to 12 micrometers.

38. The system of claim 37 wherein said incident spot has said dimension equal to approximately 6 micrometers.

39. The system of claim 1 wherein said optical unit includes a tracking assembly for tracking said incident spot in said groove, said tracking assembly including a vertical unit, a lateral unit and a tangential unit.

40. The system of claim 39 wherein said lateral unit and said tangential unit include in common said optical source and said optical sensor.

41. An optical turntable system for playing a photograph record having a recorded signal, represented by first and second recorded signal components, recorded in a spiral groove formed into the surface of the record where the groove is formed by first and second walls where said walls intersect at approximately 90 degrees, each wall positioned at an angle of approximately 45 degrees with respect to the surface of the record, said first and second walls having positions modulated by said first and second recorded signal components, respectively, said system comprising,
a drive assembly for rotating said record,
an optical unit including first and second optical sources providing first and second incident light beams incident onto said first and second walls to form first and second incident spots, respectively, to provide first and second reflected beams, respectively, from said first and second walls at first and second reflected angles, respectively, proportional to said first and second recorded signal components, respectively, and including first and second optical sensors receiving first and second reflected spots at first and second spot positions determined by said first and second reflected beams, respectively, to provide first and second output signals proportional to said first and second spot positions and the first and second recorded signal components, respectively.

42. The system of claim 41 wherein said optical unit is displaced from the surface of the record and adapted to be relatively moved with respect to the record, said optical unit having a lateral unit for lateral tracking,
said lateral unit including said first and second optical sources and said first and second optical sensors,
wherein said first reflected beam from said first wall is reflected at said first reflected angle to cause the first reflected beam to be partially blocked by said second wall thereby resulting in a first blocked reflected beam component and a first non-blocked reflected beam component, said first non-blocked reflected beam component having a first magnitude determined as a function of the extent of blocking of said first reflected beam by said second wall,
wherein said second reflected beam from said second wall is reflected at a second reflected angle to cause the second reflected beam to be partially blocked by said first wall thereby resulting in a second blocked reflected beam component and a second non-blocked reflected beam component, said second non-blocked reflected beam component having a second magnitude determined as a function of the extent of blocking of said second reflected beam by said first wall,
wherein said first optical sensor senses said first non-blocked reflected beam component to provide a first lateral tracking signal proportional to said first magnitude,
wherein said second optical sensor senses said second non-blocked reflected beam component to provide a second lateral tracking signal proportional to said second magnitude,
said lateral unit further including difference means for subtracting said first and second lateral tracking signals to form a tracking error signal, and lateral servo means responsive to said lateral tracking error signal for driving said optical unit to position said first and second light beams to be incident on said first and second walls, respectively, so as to tend to make said first magnitude and said second magnitude equal as said record is rotated relative to said optical unit.

43. The system of claim 42 wherein said optical unit has a vertical displacement above the surface of said record further includes a vertical unit, said vertical unit including a height detector for detecting the vertical displacement of said optical unit relative to the surface of said record, said vertical unit including means for maintaining said optical system at a predetermined height relative to said record surface.

44. The system of claim 43 wherein said height detector includes a height light source providing a height light beam incident across a plurality of sections of said groove to provide a reflected height light beam and includes a height sensor for sensing the reflected height light beam.

45. An optical turntable system for playing a phonograph record having a recorded signal, represented by first and second recorded signal components, in a spiral groove into the surface of the record where the groove is formed by said first and second walls where said walls intersect at approximately 90 degrees, each wall at an angle of approximately 45 degrees with respect to the surface of the record, each of said walls having lateral positions modulated by said first and second recorded signal components, respectively, said system comprising,
a drive unit for rotating said record,
an optical unit displaced from the surface of the record and adapted to be relatively moved with respect to the record, said optical unit having a detector,
said detector including,
a first optical source providing a first light beam incident onto said first wall to form a first incident spot and to provide a first reflected beam from said first wall reflected at a first reflected angle, proportional to said first recorded signal component, causing said the first reflected beam to be partially blocked by said second wall thereby resulting in a first blocked reflected beam component and a first non-blocked reflected beam component, said first non-blocked reflected beam component forming a first reflected spot having a first size determined as a function of the extent of blocking by said second wall, a second optical source providing a second light beam incident onto said second wall to provide a second reflected beam from said second wall reflected at a second reflected angle, proportional to said second recorded signal component, causing said second reflected beam to be partially blocked by said first wall thereby resulting in a second blocked reflected beam component and a second non-blocked reflected beam component, said second non-blocked reflected beam component forming a second reflected spot having a second size determined as a function of the extent of blocking by said first wall, a first optical sensor for sensing said first non-blocked reflected beam component to provide a first tracking signal proportional to said first size and to provide a first output data signal proportional to said first recorded signal component, a second optical sensor for sensing said second non-blocked reflected beam component to provide a second tracking signal proportional to said second size and to provide a second data output signal proportional to said second recorded signal component, difference means for subtracting said first and second tracking signals to form a tracking error signal, lateral servo means responsive to said tracking error signal for driving said optical unit to position said first and second light beams to be incident on said first and second walls, respectively, within said groove as said record is rotated relative to said optical system.

46. An optical turntable system for playing a phonograph record having a recorded signal, represented by first and second recorded signal components, in a spiral groove in the surface of the record where the groove is formed by first and second walls where said walls intersect at approximately 90 degrees, each wall at an angle of approximately 45 degrees with respect to the surface of the record, each of said walls having positions modulated by first and second recorded signal components, respectively, said system comprising, a drive unit for rotating said record, an optical unit displaced from the surface of the record and adapted to be relatively moved with respect to the record, said optical unit including a data detector, said data detector including, a first optical source providing a first light beam incident onto said first wall to provide a first reflected beam from said first wall at a first reflected angle proportional to the first recorded component, said first reflected beam forming a first spot, a second optical source providing a second light beam incident onto said second wall to provide a second reflected beam from said second wall at a second reflected angle proportional to said second recorded component, said second reflected beam forming a second spot, a first optical sensor for sensing the reflected angle of said first reflected beam by sensing the position of said first spot to provide a first output signal proportional to the first recorded component, a second optical sensor for sensing the reflected angle of said second reflected beam by sensing the position of said second spot to provide a second output signal proportional to the second recorded component, tracking means for positioning said optical unit so as to cause said first and second light beams to the incident on said first and second walls within said groove as said record is rotated relative to said optical system.

47. The system of claim 46 wherein said tracking means includes lateral means for detecting and controlling the lateral position of said first and second light beams whereby said light beams track said groove as said record rotates.

48. The system of claim 46 wherein said tracking means includes vertical means for maintaining said optical unit at a predetermined height relative to said record surface.

49. The system of claim 46 wherein said tracking means includes first sensor means for sensing the reflected light in said first reflected beam, includes second sensor means for sensing the reflected light in said second reflected beam, includes means for forming an error signal proportional to the difference in intensity of reflected light sensed by said first and said second sensors.

50. The system of claim 9 wherein said tracking assembly includes electronic means for processing said first and second detector signals to form said lateral error signal, said electronic means including sum means for summing said first and second detector signals to form a sum signal, including difference means for subtracting said first detector signal from said second detector signal to form a difference signal, including division means for dividing said difference signal by said sum signal to normalize said detector signals and thereby form said lateral error signal.

51. The system of claim 9 wherein said tracking assembly includes electronic means for processing said first and second detector signals to form said lateral error signal, said electronic means including difference means for subtracting said first detector signal from said second detector signal to form a difference signal including control means to control said difference signal with said sum signal to normalize said difference signal and thereby form said lateral error signal.

52. The system of claim 51 wherein said control means is a division means.

53. The system of claim 7 wherein said electronic means includes means for forming a velocity signal from said first and second detector signals and wherein said lateral unit includes scanner means driven in response to said velocity signal.

54. An optical turntable system for playing a record having a recorded signal in a groove where the groove is formed by a first wall and a second wall having positions modulated by the recorded signal where said first wall and said second wall intersect at an angle, each of said walls extending at an angle with respect to a plane formed by the surface of said record, comprising, first and second optical units including first and second optical sources and first and second optical sensors, said source providing first and second light beams incident to form first and second incident spots on said first and second walls and first and second reflected beams from said walls forming first and second reflected spots formed by first and second incident rays at said first and second optical sensors, respectively, with spot positions proportional to the recorded signals, said optical sensors for sensing the spot positions of said reflected spots to provide output signals proportional to the recorded signals, said first optical source providing the light beam incident onto said first wall at first incident angle with respect to an axis normal to the plane of said first wall at the point of incidence of said first beam whereby the reflected angle for said first reflected beam is proportional to said first incident angle and said first recorded signal, said second source and said second sensor positioned relative to said second wall such that one component of said second reflected beam is blocked by said first wall and such that a second component of said second reflected beam is not blocked by said first wall whereby said second detector signal is proportional to said second component of said second reflected beam, a tracking assembly for causing said light beam to be tracked with said groove as the record rotates, said tracking assembly including a vertical unit for positioning said optical unit a predetermined height from said record, said vertical unit including a vertical detector for detecting said predetermined height and for providing a vertical error signal as a function of the vertical displacement of the optical unit from said predetermined height and including vertical servo means responsive to said vertical error signal for tracking said optical unit at said predetermined height, said vertical detector including a vertical source for providing an incident vertical detector beam incident upon the record surface to provide a reflected vertical detector beam and including a vertical sensor positions to sense said vertical detector reflected beam, said vertical detector incident beam being approximately orthogonal to said first and said second incident light beams, a drive assembly for moving the record relative to said optical unit.

* * * * *